(12) United States Patent
Prosperi et al.

(10) Patent No.: US 12,493,478 B2
(45) Date of Patent: Dec. 9, 2025

(54) EXTENDING USER INTERFACE FUNCTIONALITY ACROSS PROCESSES USING DECLARATIVE DEFINITION, DATA BINDING, AND DATA SYNCHRONIZATION

(71) Applicant: Microsoft Technology Licensing, LLC, Redmond, WA (US)

(72) Inventors: Matteo Prosperi, Seattle, WA (US); Andrew William Sarratori, Merrimack, NH (US); Andrew Layne Arnott, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 18/159,045

(22) Filed: Jan. 24, 2023

(65) Prior Publication Data
US 2024/0248731 A1   Jul. 25, 2024

(51) Int. Cl.
*G06F 9/451*   (2018.01)
*G06F 8/65*   (2018.01)

(52) U.S. Cl.
CPC .............. *G06F 9/451* (2018.02); *G06F 8/65* (2013.01)

(58) Field of Classification Search
CPC ....................................................... G06F 9/451
USPC ........................................................ 715/764
See application file for complete search history.

(56) References Cited

U.S. PATENT DOCUMENTS

2023/0401332 A1* 12/2023 Vahidnia ............... H04L 63/101

FOREIGN PATENT DOCUMENTS

CA   3028273 C * 9/2019 ........... H04L 43/026

OTHER PUBLICATIONS

IBM Redbook, "Modernizing IBM i Applications from the Database to the User Interface and Everthing in Between"; Amra et al.; May 31, 2017; SG24-8185-00.*
IBM Redbook, "Deliver Modern UI for IBM BPM with the Coach Framework and Other Approaches"; Boren et al.; Oct. 21, 2016; SG24-8355-00.*
IBM Redbook, "WebSphere Business Integration Adapters: An Adapter Development and WebSphere Business Integration Solution"; Gavin et al.; Jul. 18, 2005; SG24-6345-00.*
IBM Redbook, "Patterns: Implementing Self-Service in an SOA Environment"; Sadtler et al.; Jan. 30, 2006; SG24-6680-01.*

(Continued)

*Primary Examiner* — Ruay Ho
(74) *Attorney, Agent, or Firm* — Wade IP Law PLLC

(57) ABSTRACT

Techniques are described herein that are capable of extending user interface functionality across processes using declarative definition, data binding, and data synchronization. A declarative definition is received at a target process in which a computer program runs from a source process in which an executable file runs. A user control in the target process is generated based at least on the declarative definition. A view model identifier that identifies a view model, which is data bound to the declarative definition, is received at the target process from the source process. A view model proxy is generated in the target process based at least on the view model identifier. The user control in the target process is data bound with the view model proxy in the target process. User interface functionality of the computer program is extended to the executable file by synchronizing the view model proxy with the view model.

22 Claims, 13 Drawing Sheets

(56) References Cited

OTHER PUBLICATIONS

"Microsoft. VisualStudio.RpcContracts", Retrieved From: https://www.nuget.org/packages/Microsoft.VisualStudio.RpcContracts/17.2.310, Oct. 17, 2022, 2 Pages.

Prosperi, Matteo, "Microsoft / VSExtensibility advanced-remote-ui.md", Retrieved From: https://github.com/microsoft/VSExtensibility/blob/main/docs/new-extensibility-model/inside-the-sdk/advanced-remote-ui.md, Aug. 6, 2022, 12 Pages.

Prosperi, Matteo, "Microsoft / VSExtensibility remote-ui.md", Retrieved From: https://github.com/microsoft/VSExtensibility/blob/main/docs/new-extensibility-model/inside-the-sdk/remote-ui.md, Aug. 6, 2022, 13 Pages.

Prosperi, Matteo, "Remote UI documentation", Retrieved From: https://github.com/microsoft/VSExtensibility/pull/100, Jul. 27, 2022, 4 Pages.

Vaughan, et al., "Microsoft / XamlBehaviorsWpf", Retrieved From: https://github.com/microsoft/XamlBehaviorsWpf, Nov. 21, 2022, 3 Pages.

\* cited by examiner

EXTENDING USER INTERFACE FUNCTIONALITY ACROSS PROCESSES USING DECLARATIVE DEFINITION, DATA BINDING, AND DATA SYNCHRONIZATION

BACKGROUND

User interface (UI) platforms that are targeted at application development (e.g., Windows Presentation Foundation (WPF) or Windows Forms) traditionally allow an application to instantiate only controls that are displayed as part of the same application's user interface, which typically makes the user interface platforms inadequate for developing application components that are meant to execute as part of a separate process or on a remote machine. Technologies that are meant for remote user interface replication (e.g., Remote Desktop Protocol, HWND sharing, X Protocol, or Blazor Server) perform computation of user interface updates externally (i.e., in the separate process or on the remote machine), which often reduces responsiveness of the user interface. Moreover, such technologies often are unfamiliar to application developers.

SUMMARY

It may be desirable to share user interface functionality across processes. For instance, the user interface of a computer program may be shared with an executable (e.g., an extension of the computer program) that runs in a different process (e.g., on a different machine) from the computer program, and vice versa. By data binding a user control, which is created based on a declarative definition of the executable's user interface, in the computer program's process with a view model proxy, which is created based on a view model of the executable's user interface, in the computer program's process and synchronizing the view model proxy with the view model, user interface may be shared between the computer program and the executable. Sharing the user interface in this manner may inhibit (e.g., prevent) a glitch in the user interface of the executable in the executable's process from causing a glitch in the user interface of the computer program in the computer program's process.

Various approaches are described herein for, among other things, extending user interface functionality across processes using declarative definition, data binding, and data synchronization. A user interface includes a declarative definition and a view model. The declarative definition defines a structure and a behavior of the user interface. The view model represents the state of the user interface at a particular time instance (e.g., at the current time). The declarative definition is data bound to the view model, meaning that changes to data of the view model result in changes to the user interface structure or behavior according to rules that are described by the declarative definition. User interactions with the user interface that affect its state may also result in changes to the data of the view model according to the rules that are described by the declarative definition. The user interface of an executable, which runs externally from a process in which a computer program runs, may include the declarative definition and the view model. The declarative definition and the view model may be used to generate a user control and a view model proxy (i.e., a proxy of the view model) in the user interface of the computer program. The user control and the view model proxy are data bound, meaning that changes to data associated with the user control result in corresponding changes in data of the view model proxy, and vice versa. Data synchronization may be used to synchronize content of the view model proxy with content of the view model. By synchronizing the content of the view model proxy with the content of the view model, changes to the content of the view model proxy result in corresponding changes in the content of the view model, and vice versa.

In an example approach, a declarative definition, which defines a structure and a behavior of a user interface, is received at a target process in which a computer program runs from a source process in which an executable file runs. The target process is external to the source process. A user control is generated in the target process based at least on the declarative definition that is received from the source process. A view model identifier that identifies a view model is received at the target process from the source process. The view model is data bound to the declarative definition and represents a state of the user interface. A view model proxy, which is a proxy of the view model, is generated in the target process based at least on the view model identifier. The user control in the target process is data bound with the view model proxy in the target process. User interface functionality of the computer program, which runs in the target process, is extended to the executable file, which runs in the source process, by synchronizing the view model proxy in the target process with the view model in the source process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
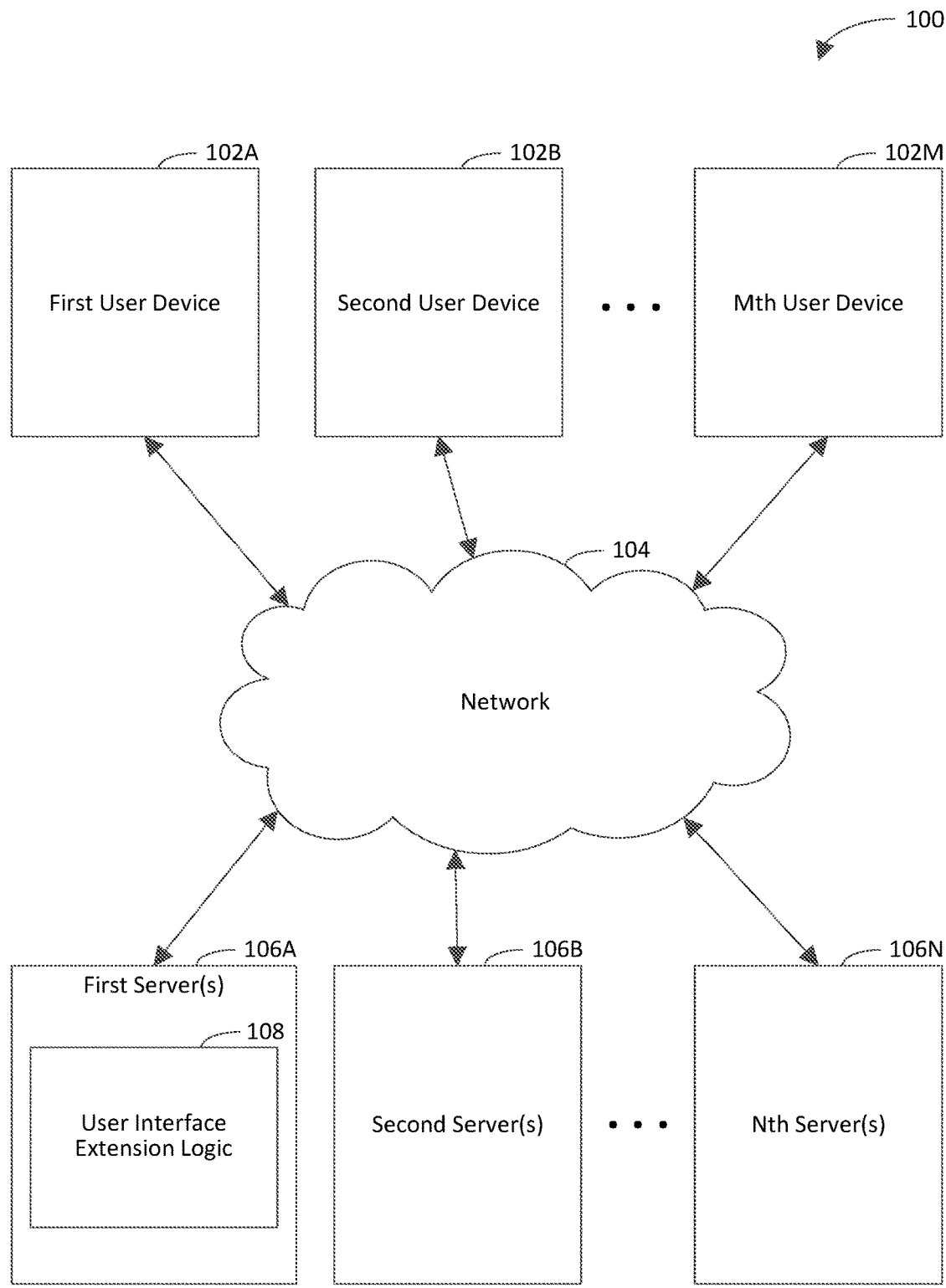
FIG. 1 is a block diagram of an example user interface extension system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to share user interface functionality across processes. For instance, user interface of a computer program may be shared with an executable (e.g., an extension of the computer program) that runs in a different process (e.g., on a different machine) from the computer program, and vice versa. By data binding a user control, which is created based on a declarative definition of the executable's user interface, in the computer program's process with a view model proxy, which is created based on a view model of the executable's user interface, in the computer program's process and synchronizing the view model proxy with the view model, user interface may be shared between the computer program and the executable. Sharing the user interface in this manner may inhibit (e.g., prevent) a glitch in the user interface of the executable in the executable's process from causing a glitch in the user interface of the computer program in the computer program's process.

Example embodiments described herein are capable of extending user interface functionality across processes using declarative definition, data binding, and data synchronization. A user interface includes a declarative definition and a view model. The declarative definition defines a structure and a behavior of the user interface. The view model represents the state of the user interface at a particular time instance (e.g., at the current time). The declarative definition is data bound to the view model, meaning that changes to data of the view model result in changes to the user interface structure or behavior according to rules that are described by the declarative definition. User interactions with the user interface that affect its state may also result in changes to the data of the view model according to the rules that are described by the declarative definition. The user interface of an executable, which runs externally from a process in which a computer program runs, may include the declarative definition and the view model. The declarative definition and the view model may be used to generate a user control and a view model proxy (i.e., a proxy of the view model) in the user interface of the computer program. The user control and the view model proxy are data bound, meaning that changes to data associated with the user control result in corresponding changes in data of the view model proxy, and vice versa. Data synchronization may be used to synchronize content of the view model proxy with content of the view model. By synchronizing the content of the view model proxy with the content of the view model, changes to the content of the view model proxy result in corresponding changes in the content of the view model, and vice versa.

Example techniques described herein have a variety of benefits as compared to conventional techniques for extending user interface functionality. For instance, the example techniques are capable of inhibiting (e.g., preventing) third-party code from introducing user interface delays to users of a computer program by causing the third-party code and the computer program to execute in separate processes while enabling user interface functionality to be shared between the third-party code and the computer program without introducing the interface delays that execution in the separate processes is intended to resolve. The example techniques are capable of enabling a user interface to be defined using traditional application development techniques (e.g., Windows Presentation Foundation (WPF) originally developed by Microsoft Corporation), including the familiar user interface definition languages and data binding approaches associated with those techniques, and traditional application development tools (e.g., Extensible Application Markup Language (XAML) editors) while avoiding the aforementioned user interface delays. The example techniques may enable the user interface to be fully rendered client-side, which may enable the user interface to avoid loss of responsiveness.

The example techniques may be used with any suitable user interface platform that relies on a declarative definition of the user interface and data binding. Examples of such an interface platform include but are not limited to WPF, Windows UI Library (WinUI), and .NET Multi-platform App UI (MAUI), all of which are developed by Microsoft Corporation. The example techniques may implement the data context (i.e., view model) using standard .NET component model interfaces, which are platform-independent and supported by a variety of user interface technologies. The example techniques may transfer the data context on-demand. The example techniques may support relatively complex reference graphs in the data context, including support for reference cycles, by assigning identifiers to uniquely identifiable objects (e.g., objects on the .NET heap) by the server. The example techniques may prevent interference with garbage collection of the objects by using weak references to cache the objects and their identifiers.

The example techniques may support concurrent client-initiated and server-initiated updates of the same objects and/or versioning-based optimistic locking. The example techniques may provide an asynchronous variant of the ICommand interface, which may enable commands to be naturally adapted to the asynchronous nature of inter-process communication. The example techniques may utilize libraries that enable user interface controls to data bind to the asynchronous execution state of asynchronous commands. By creating a real control associated with a graphical subsystem (e.g., WPF) inside the graphical subsystem, the example techniques may leverage the features of the graphical subsystem (e.g., accessibility and dots-per-inch scaling) and/or inherit user interface themes and styling of the graphical subsystem.

The example techniques may reduce an amount of time and/or resources (e.g., processor cycles, memory, network bandwidth) that is consumed to create a user interface and/or to share functionality of the user interface across processes. By enabling traditional application development techniques and tools to be used to define a user interface, the additional time and resources that would have been consumed to define the user interface using a conventional technique such as hypertext markup language (HTML) may be avoided. By preventing a user interface delay in third-party code that runs in a first process from causing a user interface delay in a computer program that runs in second process, the time and resources that would have been consumed to address the user interface delay in the computer program may be avoided. By reducing the amount of time and/or resources that is consumed by a computing system to create a user interface and/or to share functionality of the user interface across processes, the efficiency of the computing system may be increased.

A user experience of an information technology (IT) professional who is tasked with managing a user interface platform that shares user interface functionality across processes may be increased, for example, by obviating a need for the IT professional to perform operations to address a user interface delay in a computer program that is caused by third-party code that runs in a different process from the computer program. A user experience of an end user of a computer program may be increased, for example, by preventing third-party code with which the computer program shares user interface functionality from causing a user interface delay in the computer program.

FIG. 1 is a block diagram of an example user interface extension system 100 in accordance with an embodiment. Generally speaking, the user interface extension system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the user interface extension system 100 extends user interface functionality across processes using declarative definition, data binding, and data synchronization. Detail regarding techniques for extending user interface functionality across processes using declarative definition, data binding, and data synchronization is provided in the following discussion.

As shown in FIG. 1, the user interface extension system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the user interface extension system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include user interface extension logic 108 for illustrative purposes. The user interface extension logic 108 is configured to receive a declarative definition, which defines a structure and a behavior of a user interface, at a target process in which a computer program runs from a source process in which an executable file runs. The target process is external to the source process. The user interface extension logic 108 is further configured to generate a user control in the target process based at least on the declarative definition that is received from the source process. The user interface extension logic 108 is further configured to receive a view model identifier that identifies a view model, which is data bound to the declarative definition and which represents a state of the user interface, at the target process from the source process. The user interface extension logic 108 is further configured to generate a view model proxy, which is a proxy of the view model, in the target process based at least on the view model identifier. The user interface extension logic 108 is further configured to data bind the user control in the target process with the view model proxy in the target process. The user interface extension logic 108 is further configured to extend user interface functionality of the computer program, which runs in the target process, to the executable file, which runs in the source process, by synchronizing the view model proxy in the target process with the view model in the source process.

The user interface extension logic 108 may be implemented in various ways to extend user interface functionality across processes using declarative definition, data binding, and data synchronization, including being implemented in hardware, software, firmware, or any combination thereof. For example, the user interface extension logic 108 may be implemented as computer program code configured to be executed in one or more processors. In another example, at least a portion of the user interface extension logic 108 may be implemented as hardware logic/electrical circuitry. For instance, at least a portion of the user interface extension logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the user interface extension logic 108 may be (or may be included in) a developer tool and/or a cloud computing program, though the scope of the example embodiments is not limited in this respect.

The user interface extension logic 108 is shown to be incorporated in the first server(s) 106A for illustrative purposes and is not intended to be limiting. It will be recognized that the user interface extension logic 108 (or any portion(s) thereof) may be incorporated in any one or more of the servers 106A-106N, any one or more of the user devices 102A-102M, or any combination thereof. For example, client-side aspects of the user interface extension logic 108 may be incorporated in one or more of the user devices 102A-102M, and server-side aspects of user interface extension logic 108 may be incorporated in one or more of the servers 106A-106N.

Figure 2:
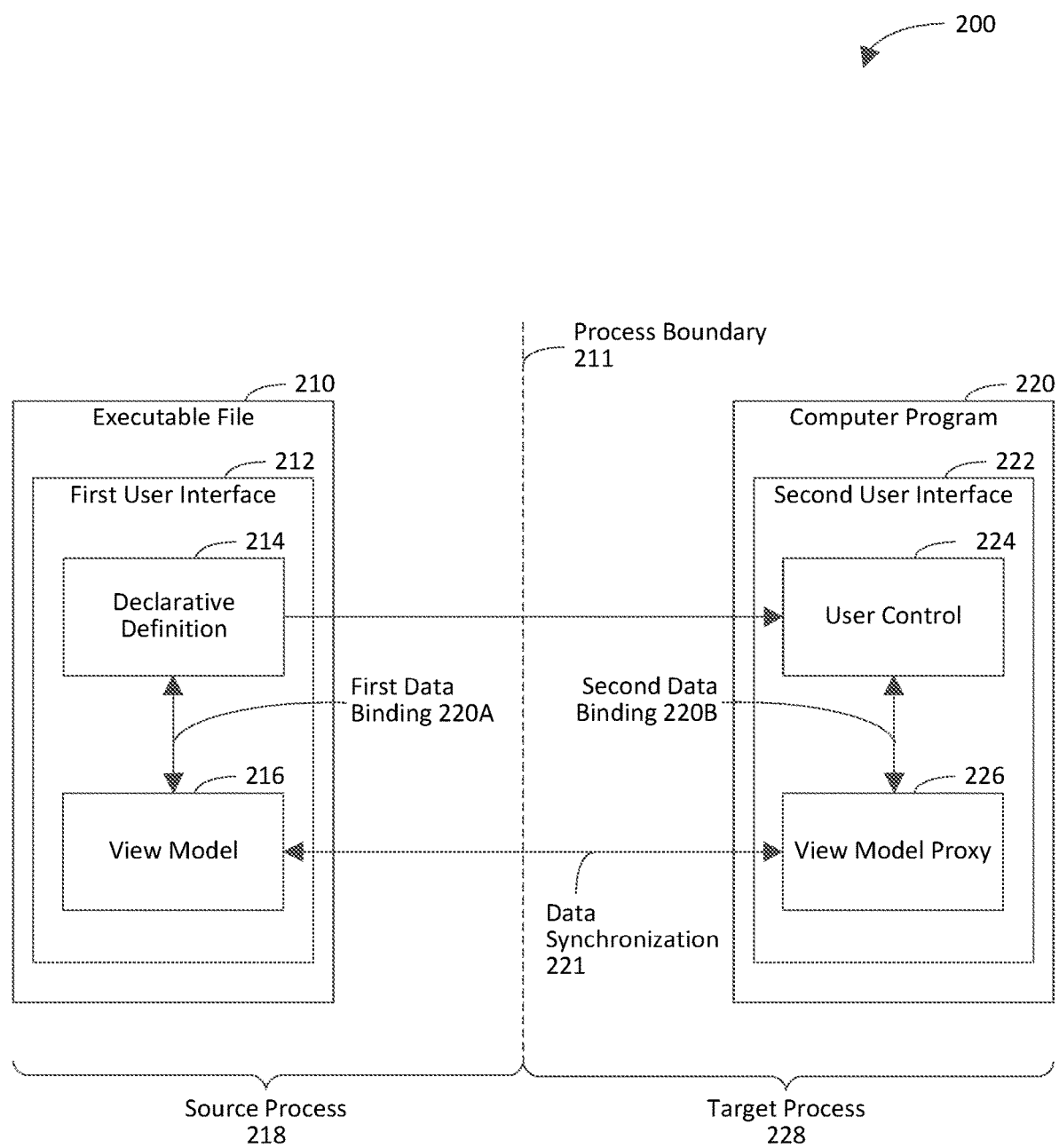
FIG. 2 is a block diagram of a system in which user interface functionality of a computer program is extended across a process boundary to an executable file in accordance with an embodiment.

FIG. 2 is a block diagram of a system 200 in which user interface functionality of a computer program 220 is extended across a process boundary 211 to an executable file 210 in accordance with an embodiment. As shown in FIG. 2, the process boundary 211 isolates a source process 218 from a target process 228. The executable file 210 executes in the source process 218, and the computer program 220 executes in the target process 228. The executable file 210 has a first user interface 212, which includes a declarative definition 214 and a view model 216. The declarative definition 214 and the view model 216 are data bound using a first data binding 220A. The computer program 220 has a second user interface 222, which includes a user control 224 and a view model proxy 226. The user control 224 and the view model proxy 226 are data bound using a second data binding 220B. The declarative definition 214 is used to generate a user control 224. The view model 216 is used to generate a view model proxy 226. The computer program 220 has a second user interface 222, which includes the user control 224 and the view model proxy 226. The user control 224 and the view model proxy 226 are data bound using a second data binding 220B. Data (e.g., objects) are shared (e.g., synchronized) between the view model 216 and the view model proxy 226 using data synchronization 221.

It should be noted that the declarative definition 214 describes how the user control 224 is data bound to the view model proxy 226. The first data binding 220A is the definition of the second data binding 220B.

In an example implementation, the user interface extension logic 108 shown in FIG. 1 establishes the first data binding 220A between the declarative definition 214 and the view model 216. In accordance with this implementation, the user interface extension logic 108 generates the user control 224 based on the declarative definition 214. In further accordance with this implementation, the user interface extension logic 108 generates the view model proxy 226 based on the view model 216. In further accordance with this implementation, the user interface extension logic 108 establishes the second data binding 220B between the user control 224 and the view model proxy 226. In further accordance with this implementation, the user interface extension logic 108 implements the data synchronization 221 to synchronize the view model 216 and the view model proxy 226. By synchronizing the view model 216 and the view model proxy 226, the user interface extension logic 108 enables the executable file 210 to utilize the user interface functionality of the second user interface 222 and further enables the computer program 220 to utilize the user interface functionality of the first user interface 212.

Figure 3:
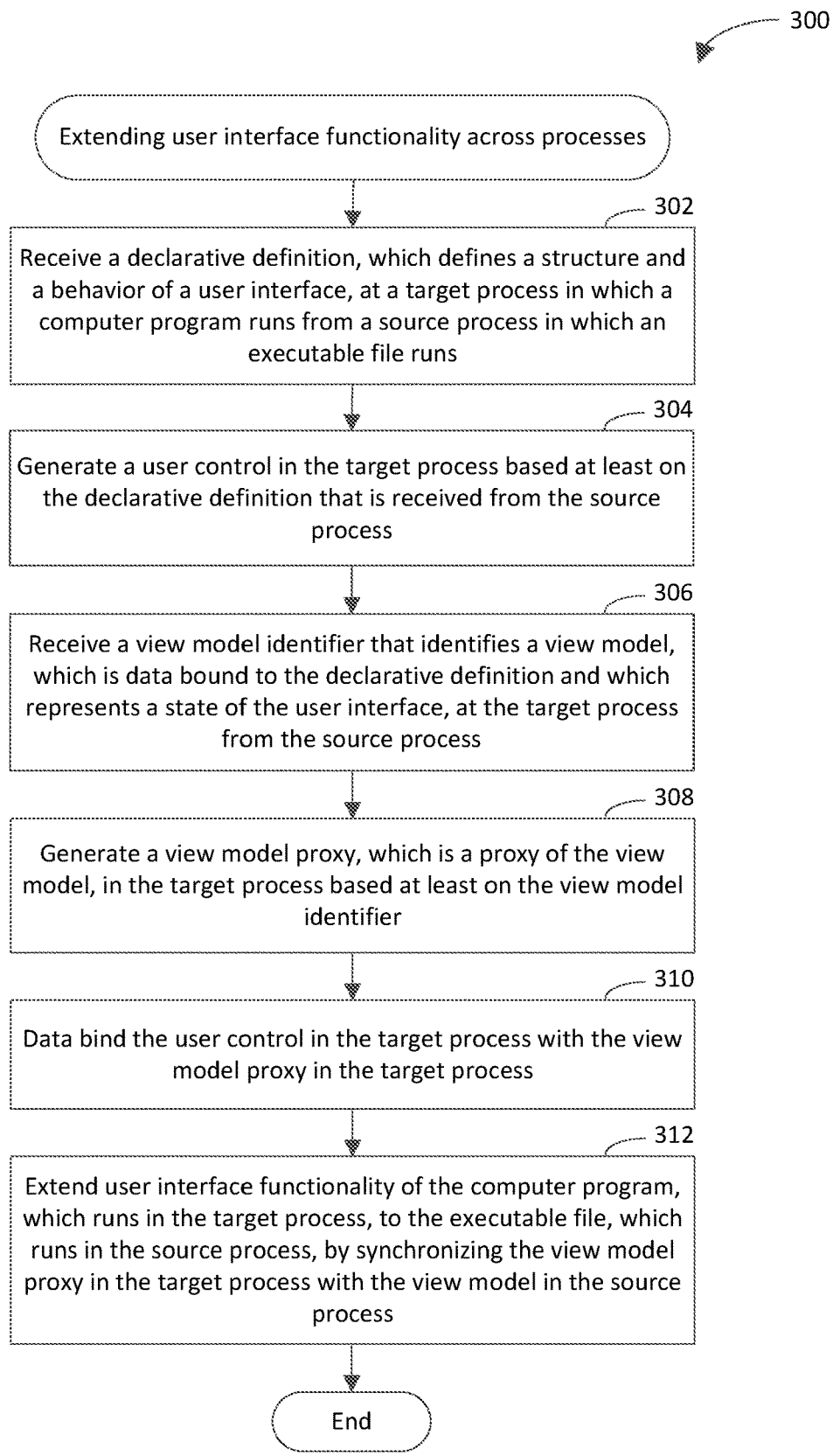
FIGS. 3-4 depict flowcharts of example methods for extending user interface functionality across processes in accordance with embodiments.
Figure 4:
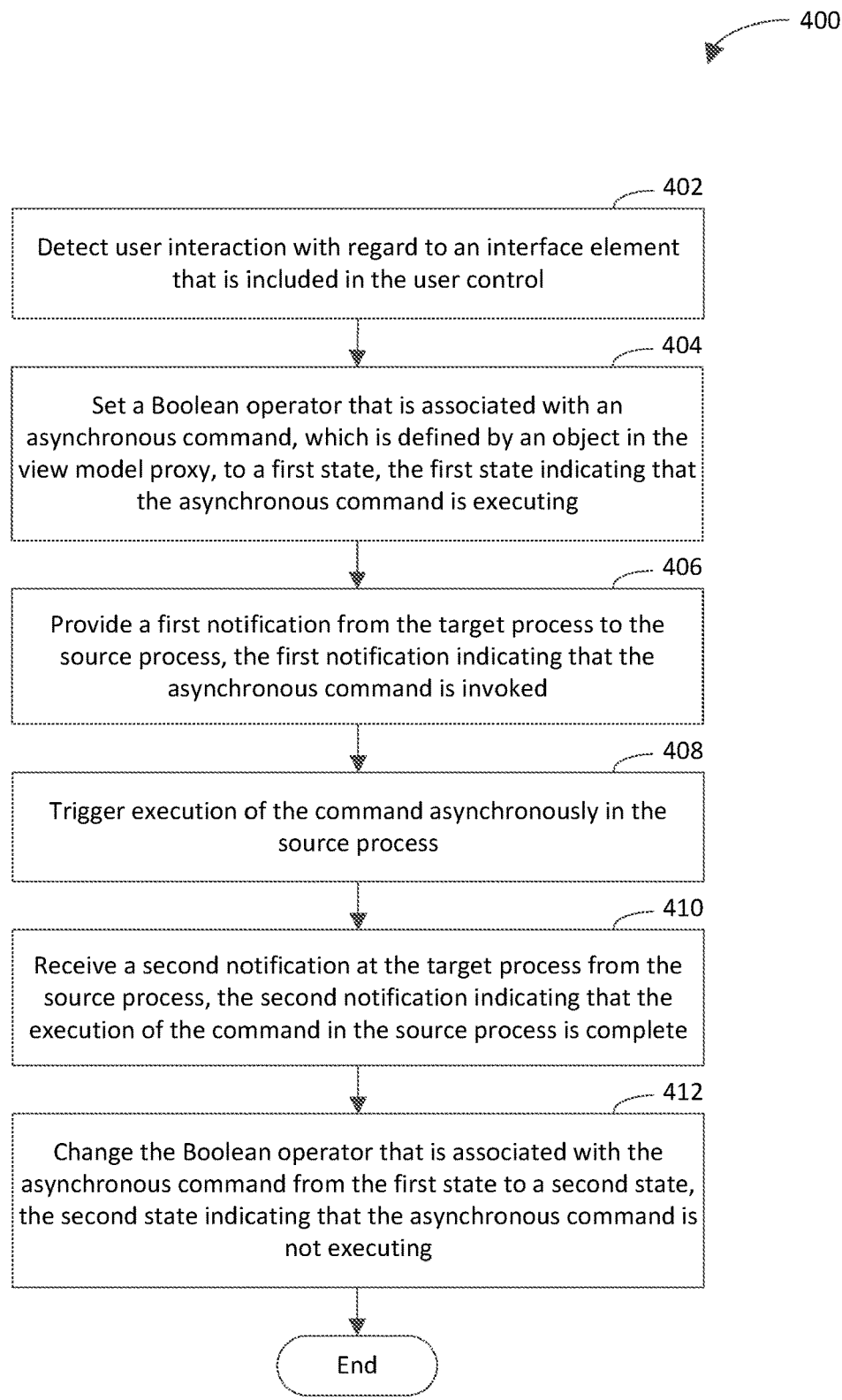
Figure 5:
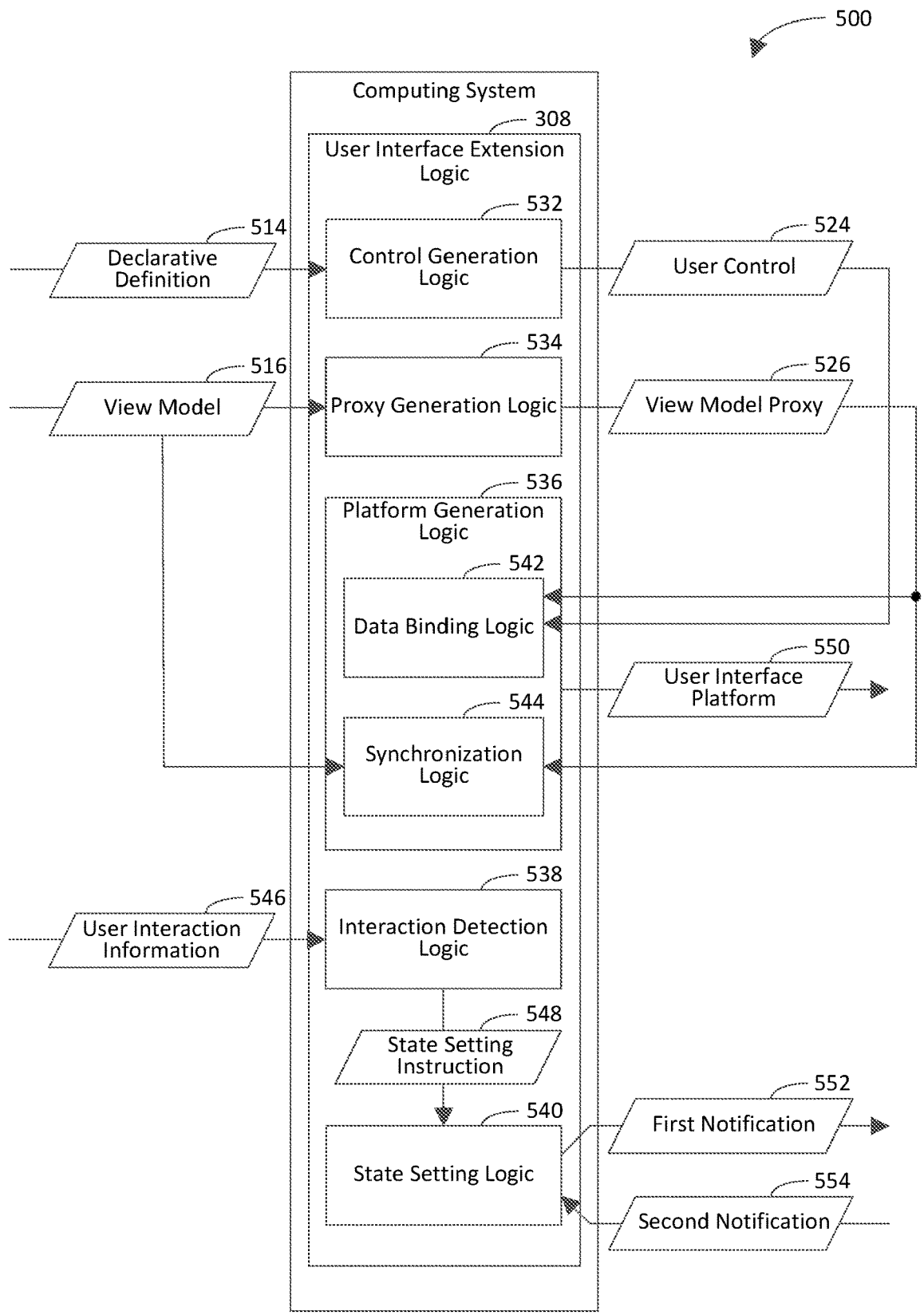
FIG. 5 is a block diagram of an example computing system in accordance with an embodiment.

FIGS. 3-4 depict flowcharts 300 and 400 of example methods for extending user interface functionality across processes in accordance with embodiments. Flowcharts 300 and 400 may be performed by the first server(s) 106A shown in FIG. 1, for example. For illustrative purposes, flowcharts 300 and 400 are described with respect to computing system 500 shown in FIG. 5, which is an example implementation of the first server(s) 106A. As shown in FIG. 5, the computing system 500 includes user interface extension logic 308. The user interface extension logic 308 includes control generation logic 532, proxy generation logic 534, platform generation logic 536, interaction detection logic 538, and state setting logic 540. The platform generation logic 536 includes data binding logic 542 and synchronization logic 544. Further structural and operational embodiments will be apparent to persons skilled in the relevant art(s) based on the discussion regarding flowcharts 300 and 400.

As shown in FIG. 3, the method of flowchart 300 begins at step 302. In step 302, a declarative definition (a.k.a. formal definition), which defines a structure and a behavior of a user interface, is received at a target process in which a computer program runs from a source process in which an executable file runs. The target process is external to the source process. In an aspect, the declarative definition is a text file (e.g., a XAML file). In another aspect, the computer program is a developer tool or a desktop application. In an example implementation, the control generation logic 532 receives a declarative definition 514, which defines the structure and the behavior of the user interface, at the target process from the source process. In an example string embodiment, the control generation logic 532 receives the declarative definition 514 in the form of a string (e.g., a string of text).

In an example embodiment, the executable file is an extension of the computer program. The extension adds functionality to the computer program. For instance, the extension may provide user interface components, such as pop-up windows, for use in the context of the computer program. In an aspect of this embodiment, the extension is a DLL file. In another aspect of this embodiment, the extension is a plug-in to the computer program.

In another example embodiment, the target process executes on the computing system, and the source process executes on another computing system. In an example implementation, the target process executes on the computing system 500, and the source process executes on a computing system that is external to the computing system 500. For example, the computing system on which the source process executes may be remote from the computing system 500 on which the target process executes. In accordance with this example, the computing system on which the source process executes may be separated from the computing system 500 on which the target process executes by a network, such as the network 104 shown in FIG. 1.

At step 304, a user control is generated in the target process based at least on the declarative definition that is received from the source process. In an aspect, the user control includes user interface functionality that conforms to the declarative definition. For instance, the declarative definition may define rules regarding the user interface functionality, and the user control may be configured to conform to the rules. In another aspect, the user control is a WPF control. In an example implementation, the control generation logic 532 generates a user control 524 in the target process based at least on the declarative definition 514. In accordance with the string embodiment, the control generation logic 532 instantiates the user control 524 from the string.

At step 306, a view model identifier that identifies a view model (a.k.a. data model or data context), which is data bound to the declarative definition and which represents a state of the user interface, is received at the target process from the source process. In an aspect, the view model is implemented using .NET component model interfaces, which are supported by multiple user interface technologies and are platform independent. In an example implementation, the proxy generation logic 534 receives the view model identifier that identifies a view model 516, which is data bound to the declarative definition 514 and which represents a state of the user interface, at the target process from the source process.

At step 308, a view model proxy, which is a proxy of the view model, is generated in the target process based at least on the view model identifier. In an aspect, the view model proxy is generated by serializing content of the view model from the source process to the target process. In an example, at least a portion (e.g., all) of the content of the view model proxy is generated using System.Dynamic .NET capabilities and/or System.Reflection.Emit .NET capabilities. In an example implementation, the proxy generation logic 534 generates a view model proxy 526, which is a proxy of the view model 516, in the target process based at least on the view model identifier.

At step 310, the user control in the target process is data bound with the view model proxy in the target process. For example, the user control may include an interface element, and the interface element may include a value of a property. In accordance with this example, the interface element may be data bound to an object in the view model proxy that defines the property. In further accordance with this example, the interface element may be a text box; the property may contain a string; and the value of the property may be the content of the string. In an example implementation, the data binding logic 542 data binds the user control 524 in the target process to the view model proxy 526 in the target process.

At step 312, user interface functionality of the computer program, which runs in the target process, is extended to the executable file, which runs in the source process, by synchronizing the view model proxy in the target process with the view model in the source process. In an example implementation, the synchronization logic 544 extends the user interface functionality of the computer program to the executable file by synchronizing the view model proxy 526 in the target process with the view model 516 in the source process. In another example implementation, the platform generation logic 536 generates a user interface platform 550, which includes the user control 524 and the view model proxy 526. For instance, the user interface platform 550 may be a remote procedure call-based user interface platform that enables the executable file to define user interface components in the context of the computer program. Upon completion of step 312, flowchart 300 ends.

In an aspect of this embodiment, data binding the user control in the target process with the view model proxy at step 310 and/or extending the user interface functionality of the computer program to the executable file at step 312 increases performance (e.g., reliability, speed, and/or efficiency) of a computing device (e.g., computing device 500) that runs the computer program, for example, by reducing a likelihood that a glitch (e.g., delay and/or non-responsiveness) in the user interface of the executable file will cause a glitch in the user interface of the computer program.

In another aspect of this embodiment, data binding the user control in the target process with the view model proxy at step 310 and/or extending the user interface functionality of the computer program to the executable file at step 312 reduces an amount of resources (e.g., time, processor cycles, storage, network bandwidth) that a computing system (e.g., computing device 500) consumes to provide user interface functionality across processes. By reducing the amount of resources that is consumed by the computing system, the efficiency of the computing system may be increased.

In an example embodiment, data binding the user control with the view model proxy at step 310 includes data binding the user control in the target process with a first instance of an object in the view model proxy in the target process. In accordance with this embodiment, synchronizing the view model proxy with the view model at step 312 includes waiting to copy content from a second instance of the object in the view model in the source process into the first instance of the object in the view model proxy in the target process until the user control in the target process is data bound to the first instance of the object in the view model proxy in the target process. For instance, the user control in the target process becoming data bound to the first instance of the object in the view model proxy in the target process may trigger copying the content from the second instance of the object in the view model in the source process into the first instance of the object in the view model proxy in the target process. In an aspect of this embodiment, waiting to copy the content may be based at least on the object being a specified object type. In another aspect of this embodiment, waiting to copy the content may be based at least on a size of the object being greater than or equal to a threshold size. For instance, the threshold size may be any suitable number of bytes (e.g., 10 megabytes (MB), 100 MB, or 2.5 gigabytes (GB)).

In an aspect of this embodiment, synchronizing the view model proxy with the view model at step 312 includes, based at least on the user control being data bound with the first instance of the object in the view model proxy, providing a content request from the target process to the source process. The content request includes an identifier that identifies the object. The content request requests content of the object. In accordance with this aspect, synchronizing the view model proxy with the view model at step 312 further includes receiving a serialized version of the content of the object at the target process from the source process based at least on the content request.

In accordance with an example embodiment, unique identifiers are assigned to most reference types. Methods such as Object.ReferenceEquals may be used to determine whether multiple (e.g., two) .NET reference-type references point to the same object. In accordance with this embodiment, .NET value types and strings are not assigned unique identifiers and are synchronized by copying their values. The behavior that is used for strings may be applied to other immutable reference types that are primarily meant to employ value equality. Examples of such an immutable reference type include but are not limited to a read-only tuple and a small immutable array. Value equality may be established between two separate instances with the same value based on the instances being deemed interchangeable for most or all purposes.

In some example embodiments, one or more steps 302, 304, 306, 308, 310, and/or 312 of flowchart 300 may not be performed. Moreover, steps in addition to or in lieu of steps 302, 304, 306, 308, 310, and/or 312 may be performed. For instance, in an example embodiment, data binding the user control with the view model proxy at step 310 includes data binding an interface element, which is included in the user control, with a state of an asynchronous command that is defined by an object in the view model proxy. In accordance with this embodiment, the method of flowchart 300 includes one or more of the steps shown in flowchart 400 of FIG. 4. As shown in FIG. 4, flowchart 400 begins at step 402. In step 402, user interaction with regard to the interface element is detected. For instance, the user interaction may include selection of the interface element by a user, initiation or loss of focus on the interface element by the user, or expansion or collapse of the interface element by the user. In an example implementation, the interaction detection logic 538 detects the user interaction with regard to the interface element. For instance, the interaction detection logic 538 may detect the user interaction based at least on user interaction information 546 indicating that the user interaction with the interface element has occurred. In an aspect of this implementation, receipt of the user interaction information 546 at the interaction detection logic 538 is triggered by the user interaction. In accordance with this implementation, the interaction detection logic 538 generates a state setting instruction 548 based at least on detection of the user interaction with regard to the interface element. The state setting instruction 548 instructs the state setting logic to change a flag associated with the asynchronous command to indicate that the asynchronous command is executing.

At step 404, a Boolean operator that is associated with the asynchronous command is set to a first state (e.g., based at least on detection of the user interaction with regard to the interface element). The first state indicates that the asynchronous command is executing. In an example implementation, the state setting logic 540 sets the Boolean operator to the first state. For instance, the state setting logic 540 may set the Boolean operator to the first state based at least on receipt of the state setting instruction 438 (e.g., based at least on state setting instruction 438 indicating that a flag associated with the asynchronous command is to be changed to indicate that the asynchronous command is executing).

At step 406, a first notification is provided from the target process to the source process (e.g., based at least on the detection of the user interaction with regard to the interface element). The first notification indicates that the asynchronous command is invoked. In an example implementation, the state setting logic 540 provides a first notification 552 from the target process to the source process. The first notification 552 indicates that the asynchronous command is invoked. For instance, the state setting logic 540 may provide the first notification 552 based at least on receipt of the state setting instruction 438 and/or based at least on the Boolean operator being set to the first state.

At step 408, execution of the asynchronous command is triggered asynchronously in the source process (e.g., based at least on the first notification being provided from the target process to the source process). In an example implementation, the state setting logic 540 triggers execution of the asynchronous command asynchronously in the source process.

At step 410, a second notification is received at the target process from the source process (e.g., as a response to the first notification). The second notification indicates that the execution of the asynchronous command in the source process is complete. In an example implementation, the state setting logic 540 receives a second notification 554 at the target process from the source process. The second notification 554 indicates that the execution of the asynchronous command in the source process has completed.

At step 412, the Boolean operator that is associated with the asynchronous command is changed from the first state to a second state. The second state indicates that the asynchronous command is not executing. In an example implementation, the state setting logic 540 changes the Boolean operator that is associated with the asynchronous command from the first state to the second state. For instance, the state setting logic 540 may change the Boolean operator from the first state to the second state based at least on receipt of the second notification 554 (e.g., based at least on the second notification 554 indicating that the execution of the asynchronous command in the source process has completed).

In an aspect of this embodiment, setting the Boolean operator to the first state at step 404 disables functionality of the interface element. In an example, because command execution is asynchronous and there is no guarantee that the control(s) that trigger the command are data bound to be disabled when the execution state is active, multiple concurrent executions of the same asynchronous command may exist. In accordance with this example, the state is held as an integer, which indicates a number of active concurrent executions, rather than a Boolean. In further accordance with this example, the state is then exposed for data binding as a Boolean such that "greater than zero" means "executing." In accordance with this aspect, changing the Boolean operator from the first state to the second state at step 412 enables the functionality of the interface element.

It will be recognized that the computing system 500 may not include one or more of the user interface extension logic 308, the control generation logic 532, the proxy generation logic 534, the platform generation logic 536, the interaction detection logic 538, the state setting logic 540, the data binding logic 542, and/or the synchronization logic 544. Furthermore, the computing system 500 may include components in addition to or in lieu of the user interface extension logic 308, the control generation logic 532, the proxy generation logic 534, the platform generation logic 536, the interaction detection logic 538, the state setting logic 540, the data binding logic 542, and/or the synchronization logic 544.

FIGS. 6-10 and 12 depict flowcharts 600, 700, 800, 900, 1000, and 1200 of example methods for synchronizing a view model proxy with a view model in accordance with embodiments. For instance, flowcharts 600, 700, 800, 900, 1000, and 1200 may represent example implementations of step 312 shown in FIG. 3. Flowcharts 600, 700, 800, 900, and 1000 may be performed by the synchronization logic 544 shown in FIG. 5, for example. For illustrative purposes, flowcharts 600, 700, 800, 900, and 1000 are described with respect to synchronization logic 1100 shown in FIG. 11, which is an example implementation of the synchronization logic 544. As shown in FIG. 11, the synchronization logic 1100 includes identifier assignment logic 1162, copying logic 1164, reference determination logic 1166, copy determination logic 1168, and object monitoring logic 1170. The identifier assignment logic 1162 includes first version number logic 1172 and second version number logic 1174. The object monitoring logic 1170 includes change detection logic 1176, object identification logic 1178, and property change logic 1180. Flowchart 1200 may be performed by the copying logic 1164 shown in FIG. 11, for example. For illustrative purposes, flowchart 1200 is described with respect to copying logic 1300 shown in FIG. 13, which is an example implementation of the copying logic 1164. As shown in FIG. 13, the copying logic 1300 includes placeholder logic 1302 and asynchronous retrieval logic 1304. Further structural and operational embodiments will be apparent to persons skilled in the relevant art(s) based on the discussion regarding flowcharts 600, 700, 800, 900, 1000, and 1200.

In an example embodiment, synchronizing the view model proxy with the view model at step 312 includes assigning unique identifiers to respective objects in the view model. For instance, the copying logic 1164 may assign the unique identifiers to respective view model objects 1182 in the view model. In accordance with this embodiment, synchronizing the view model proxy with the view model at step 312 further includes copying the objects and the unique identifiers that are assigned to the respective objects from the view model into the view model proxy. For example, the copying logic 1164 may generate unique ID information 1192 to indicate the unique identifiers that are assigned to the respective view model objects 1182. In accordance with this example, the copying logic 1164 may copy the view model objects 1182 and the unique identifiers, as indicated by the unique ID information 1192, from the view model into the view model proxy. In another example, the copying logic 1164 may maintain a hierarchical relationship, which exists between the objects in the view model, in the view model proxy.

In an aspect of this embodiment, correlation between the unique identifiers and the respective objects in the view model is preserved using weak references, such that the correlation does not interfere with garbage collection of the objects. A weak reference is a reference to an object that does not interfere with (e.g., does not prevent) garbage collection of the object.

Figure 6:
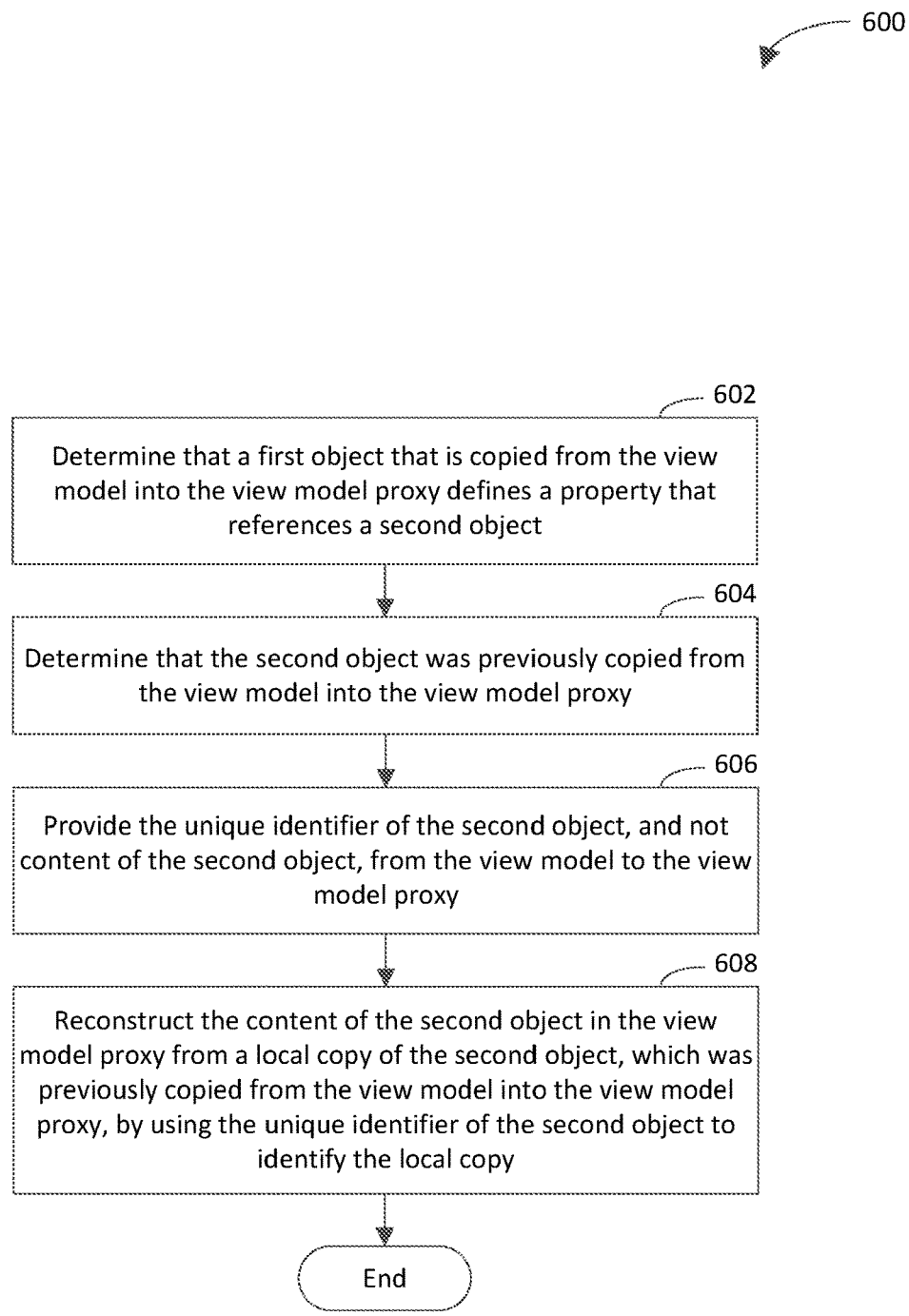
FIGS. 6-10 and 12 depict flowcharts of example methods for synchronizing a view model proxy with a view model in accordance with embodiments.

In another aspect of this embodiment, synchronizing the view model proxy with the view model at step 312 further includes one or more of the steps shown in flowchart 600 of FIG. 6. As shown in FIG. 6, the method of flowchart 600 begins at step 602. In step 602, a determination is made that a first object that is copied from the view model into the view model proxy defines a property that references a second object. In an example implementation, the reference determination logic 1166 determines that the first object defines a property that references the second object. In an aspect of this implementation, the copying logic 1164 generates object property information 1189, which indicates properties that are defined by the objects that are copied from the view model into the view model proxy. For instance, the object property information 1189 may cross-reference each object that is copied from the view model to the view model proxy with each property that is defined by the respective object. In accordance with this aspect, the reference determination logic 1166 analyzes the object property information 1189 to identify the first object and to determine that the first object defines a property that references the second object. In accordance with this implementation, the reference determination logic 1166 generates referenced object information 1190, which indicates that the second object is referenced by a property defined by another object that is copied from the view model into the view model proxy.

At step 604, a determination is made that the second object was previously copied from the view model into the view model proxy. In an example implementation, the copy determination logic 1168 determines that the second object was previously copied from the view model into the view model proxy. In an aspect of this implementation, the copy determination logic 1168 analyzes the referenced object information 1190 to determine that the second object is referenced by a property defined by another object that is copied from the view model into the view model proxy. In an aspect of this implementation, the copying logic 1164 generates copied object information 1185, which includes information regarding each object that has been copied from the view model into the view model proxy. In accordance with this aspect, the copy determination logic 1168 analyzes the copied object information 1185 to determine that the second object, as indicated by the referenced object information 1190, is indicated by the copied object information 1185 to have been copied from the view model into the view model proxy. In accordance with this implementation, the copy determination logic 1168 generates a copying instruction 1194 based on the determination that the second object was previously copied from the view model into the view model proxy. In accordance with this aspect, the copying instruction 1194 instructs the copying logic 1164 to provide the unique identifier of the second object, and not content of the second object, from the view model to the view model proxy.

At step 606, the unique identifier of the second object, and not content of the second object, is provided from the view model to the view model proxy (e.g., based at least on the second object being previously copied from the view model into the view model proxy). In an example implementation, based on the copying instruction 1194 (e.g., based on the copying instruction 1194 instructing the copying logic 1164 to provide the unique identifier of the second object, and not the content of the second object, from the view model to the view model proxy), the copying logic 1164 provides the unique identifier of the second object, and not the content of the second object, from the view model to the view model proxy.

At step 608, the content of the second object is reconstructed in the view model proxy from a local version of the second object, which was previously copied from the view model into the view model proxy, by using the unique identifier of the second object to identify the local version. In an example implementation, the copying logic 1164 reconstructs the content of the second object in the view model proxy from the local version of the second object, which was previously copied from the view model into the view model proxy, by using the unique identifier of the second object to identify the local version.

Figure 7:
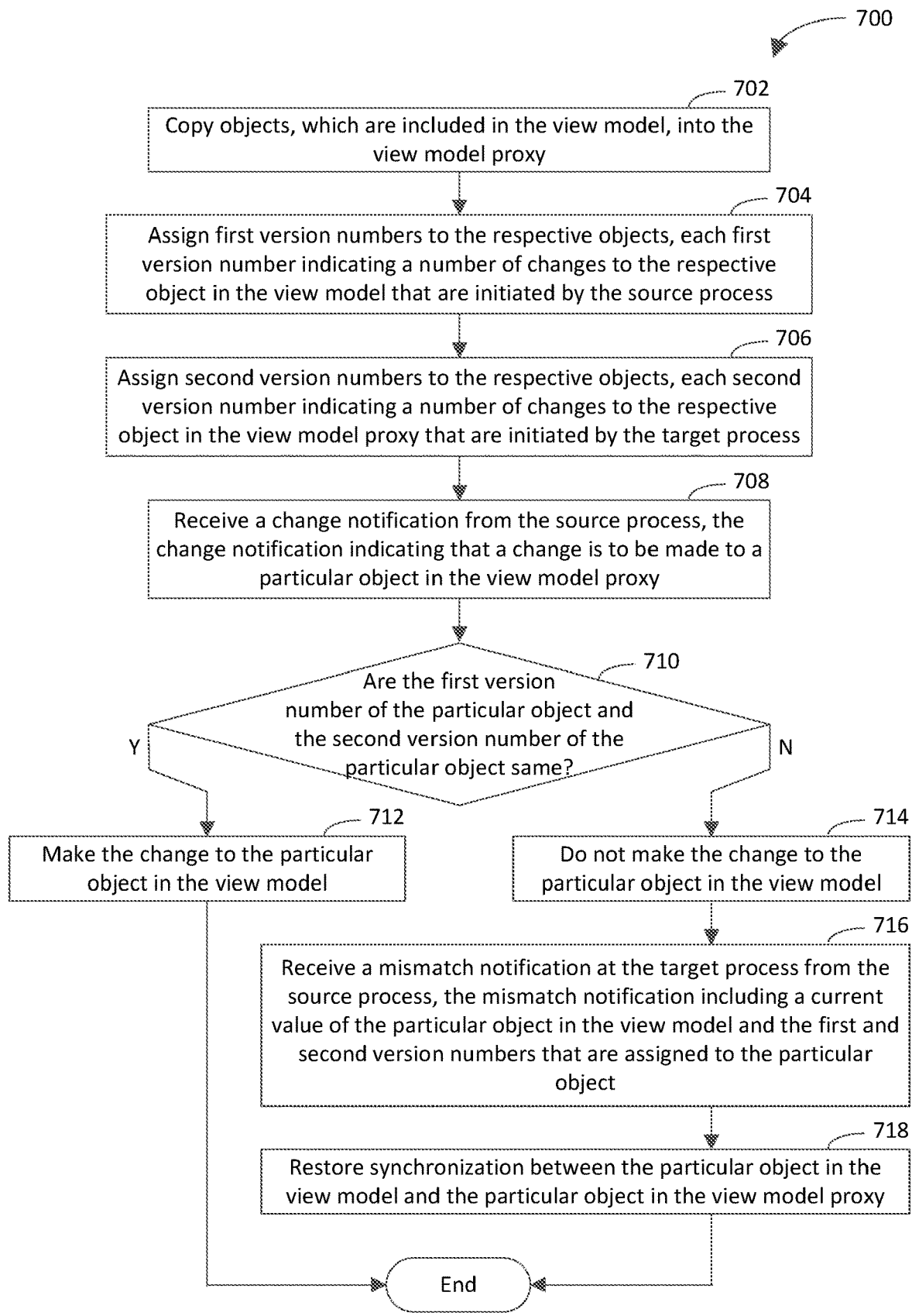

In another example embodiment, synchronizing the view model proxy with the view model at step 312 includes one or more of the steps shown in flowchart 700 of FIG. 7. As shown in FIG. 7, the method of flowchart 700 begins at step 702. In step 702, objects, which are included in the view model, are copied into the view model proxy. In an example implementation, the copying logic 1164 copies view model objects 1182, which are included in the view model, into the view model proxy.

At step 704, first version numbers are assigned to the respective objects. Each first version number indicates a number of changes to the respective object in the view model that are initiated by the source process (e.g., since creation of the respective object). In an example implementation, the first version number logic 1172 assigns the first version numbers to the respective view model objects 1182. In accordance with this implementation, the identifier assignment logic 1162 generates identifier information 1188, which indicates the first version numbers that are assigned to the respective view model objects 1182. For instance, the identifier information 1188 may cross-reference identifiers that identify the respective view model objects 1182 with the first version numbers that are assigned to the respective view model objects 1182.

At step 706, second version numbers are assigned to the respective objects. Each second version number indicates a number of changes to the respective object in the view model proxy that are initiated by the target process (e.g., since creation of the respective object). In an example implementation, the second version number logic 1174 assigns the second version numbers to the respective view model objects 1182. In accordance with this implementation, the identifier assignment logic 1162 configures the identifier information 1188 to indicate the second version numbers that are assigned to the respective view model objects 1182. For instance, the identifier information 1188 may cross-reference the identifiers that identify the respective view model objects 1182 with the first version numbers that are assigned to the respective view model objects 1182.

In an example embodiment, the first version numbers and the second version numbers are assigned to the respective objects at steps 704 and 706 based on the objects being configured to have incremental updates. An incremental update of an object is an update that builds on the current state of the object. The first and second version numbers may be helpful in resolving conflicts. For example, the source process and the target process may attempt to update the same entry in an array. In accordance with this example, the order of execution of the updates will result in different states of the array. In another example, the source process and the target process may attempt to append a value to the same list. In accordance with this example, the order of execution of the updates will result in different states of the list.

At step 708, a change notification is received from the source process. The change notification indicates that a change is to be made to a particular object in the view model proxy. In an example implementation, the copying logic 1164 receives a change notification 1183 from the source process. The change notification 1183 indicates the change that is to be made to the particular object in the view model proxy.

At step 710, a determination is made whether the first version number of the particular object and the second version number of the particular object are same. If the first version number of the particular object and the second version number of the particular object are the same, flow continues to step 712. Otherwise, flow continues to step 714. In an example implementation, the copying logic 1164 determines whether the first version number of the particular object and the second version number of the particular object are the same. In accordance with this implementation, the copying logic 1164 compares the first and second version numbers of the particular object, as indicated by the identifier information 1188, to make the determination.

At step 712, the change is made to the particular object in the view model. In an example implementation, the copying logic 1164 makes the change to the particular object in the view model. Upon completion of step 712, flowchart 700 ends.

At step 714, the change is not made to the particular object in the view model. In an example implementation, the copying logic 1164 does not make the change to the particular object in the view model. In an aspect of this implementation, the copying logic 1164 also does not make the change to the particular object in the view model proxy (e.g., based at least on the first version number of the particular object and the second version number of the particular object not being the same).

At step 716, a mismatch notification is received at the target process from the source process. The mismatch notification indicates that the first version number of the particular object and the second version number of the particular object are not the same. The mismatch notification includes a current value of the particular object in the view model and the first and second version numbers that are assigned to the particular object. In an example implementation, the copying logic 1164 receives a mismatch notification 1184 at the target process from the source process. The mismatch notification 1184 indicates that the first version number of the particular object, as assigned by the first version number logic 1172, and the second version number of the particular object, as assigned by the second version number logic 1174, are not the same. The mismatch notification 1184 includes the current value of the particular object in the view model and the first and second version numbers that are assigned to the particular object.

At step 718, synchronization between the particular object in the view model and the particular object in the view model proxy is restored. In an example implementation, the copying logic 1164 restores the synchronization between the particular object in the view model and the particular object in the view model proxy, based on the mismatch notification (e.g., based on the current value of the particular object in the view model and the first and second version numbers that are assigned to the particular object, which are included in the mismatch notification 1184).

Figure 8:
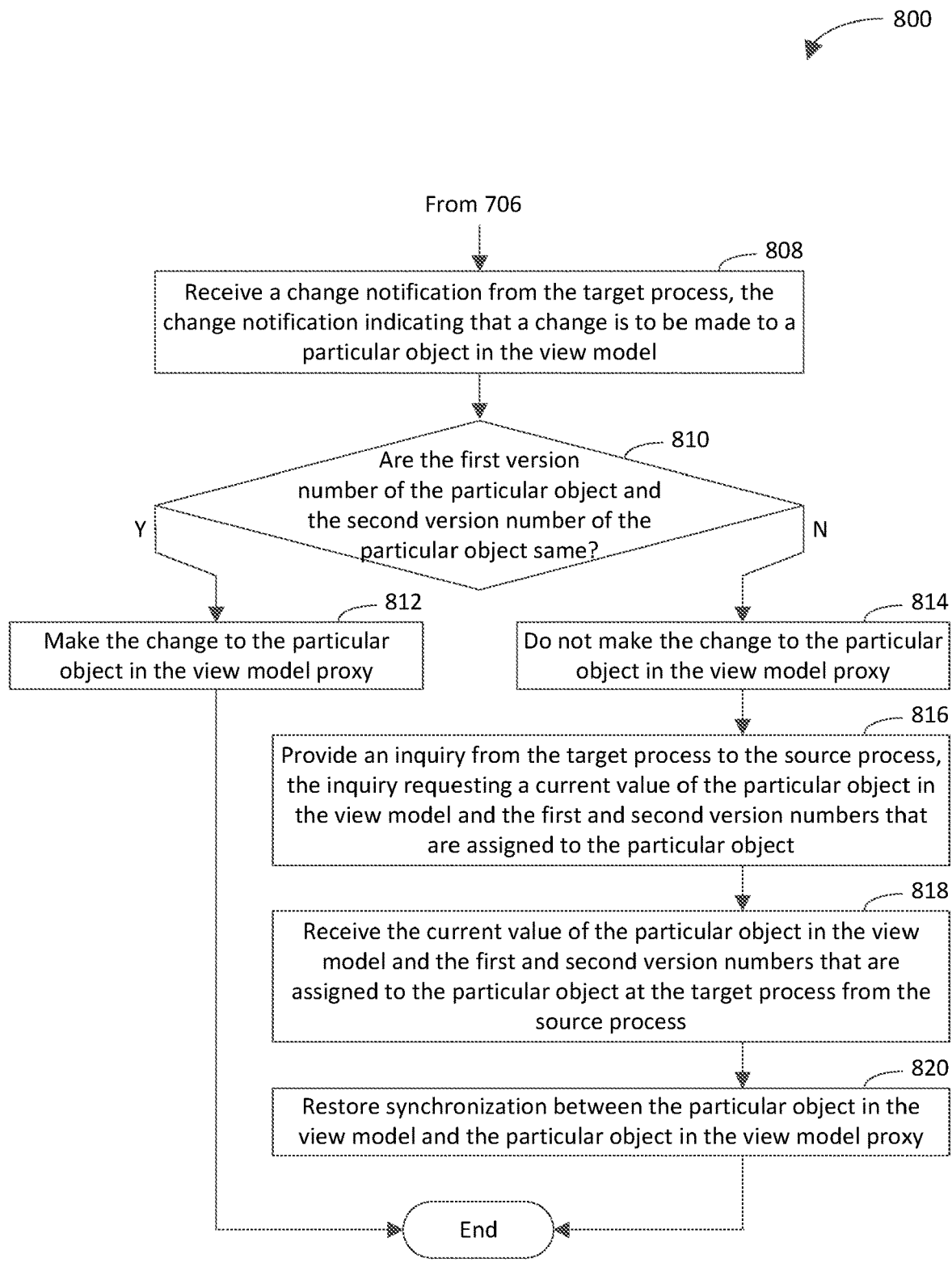

In yet another example embodiment, synchronizing the view model proxy with the view model at step 312 includes one or more of the steps shown in flowchart 800 of FIG. 8. As shown in FIG. 8, the method of flowchart 800 begins at step 808. For instance, step 808 may be performed after completion of steps 702, 704, and 706 shown in FIG. 7. Accordingly, the steps shown in flowchart 800 may be performed in lieu of steps 708, 710, 712, 714, 716, and 718 of flowchart 700 shown in FIG. 7. In step 808, a change notification is received from the target process. The change notification indicates that a change is to be made to a particular object in the view model. In an example implementation, the copying logic 1164 receives a change notification 1183 from the target process. The change notification 1183 indicates the change that is to be made to the particular object in the view model.

At step 810, a determination is made whether the first version number of the particular object and the second version number of the particular object are same. If the first version number of the particular object and the second version number of the particular object are the same, flow continues to step 812. Otherwise, flow continues to step 814. In an example implementation, the copying logic 1164 determines whether the first version number of the particular object and the second version number of the particular object are the same. In accordance with this implementation, the copying logic 1164 compares the first and second version numbers of the particular object, as indicated by the identifier information 1188, to make the determination.

At step 812, the change is made to the particular object in the view model proxy. In an example implementation, the copying logic 1164 makes the change to the particular object in the view model proxy. Upon completion of step 812, flowchart 800 ends.

At step 814, the change is not made to the particular object in the view model proxy. In an example implementation, the copying logic 1164 does not make the change to the particular object in the view model proxy. In an aspect of this implementation, the copying logic 1164 also does not make the change to the particular object in the view model (e.g., based at least on the first version number of the particular object and the second version number of the particular object not being the same).

At step 816, an inquiry is provided from the target process to the source process. The inquiry requests a current value of the particular object in the view model and the first and second version numbers that are assigned to the object. In an example implementation, the copying logic 1164 provides an inquiry 1193 from the target process to the source process. The inquiry 1193 requests the current value of the particular object in the view model and the first and second version numbers that are assigned to the object.

At step 818, the current value of the particular object in the view model and the first and second version numbers that are assigned to the object are received at the target process from the source process. In an example implementation, the copying logic 1164 receives the current value of the particular object in the view model and the first and second version numbers that are assigned to the object at the target process from the source process.

At step 820, synchronization between the particular object in the view model and the particular object in the view model proxy is restored. In an example implementation, the copying logic 1164 restores the synchronization between the particular object in the view model and the particular object in the view model proxy, based on the current value of the particular object in the view model and the first and second version numbers that are assigned to the object, as received at the target process from the source process.

Figure 9:
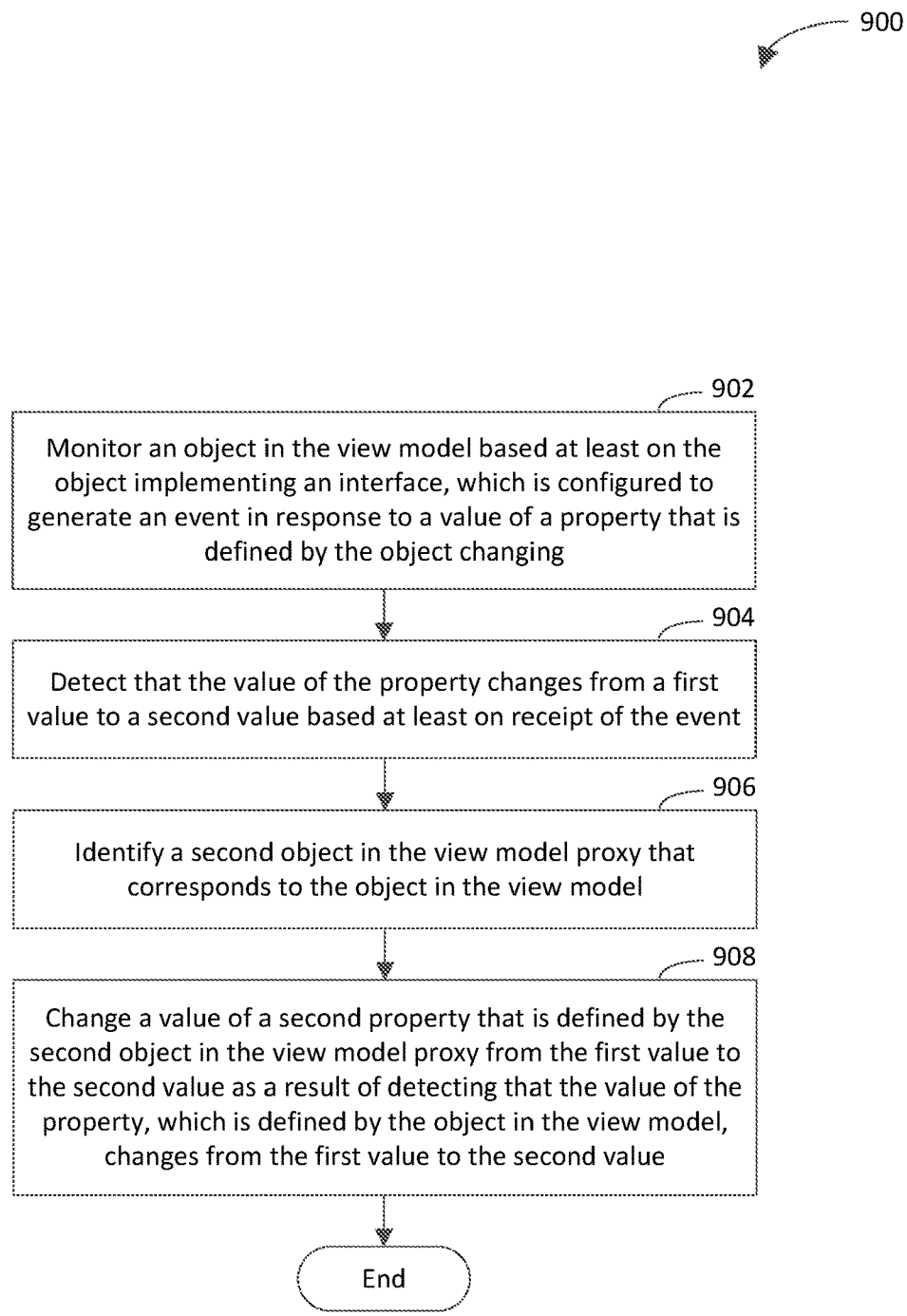

In still another example embodiment, synchronizing the view model proxy with the view model at step 312 includes causing a change in the view model to be automatically replicated in the view model proxy. In an aspect of this embodiment, the change in the view model being automatically replicated in the view model proxy may cause a corresponding change to be automatically made in a user control that is data bound to the view model proxy. In another aspect of this embodiment, causing the change in the view model to be automatically replicated in the view model proxy includes one or more of the steps shown in flowchart 900 of FIG. 9. As shown in FIG. 9, the method of flowchart 900 begins at step 902. In step 902, an object in the view model is monitored based at least on the object implementing an interface, which is configured to generate an event in response to a value of a property that is defined by the object changing. In an example, monitoring of the object at step 902 is initiated by subscribing to the event that the interface implemented by the object is configured to generate. In another example, the object in the view model is monitored at step 902 using reflection. Reflection is a .NET capability that enables enumeration of properties and other functionalities of an object. For instance, reflection may enable a piece of code to obtain a description and data of an object that is an unknown object type. In an example implementation, the object monitoring logic 1170 monitors the object based at least on the object implementing the interface, which is configured to generate a property change event 1186 as a result of the value of the property that is defined by the object changing.

At step 904, the value of the property changing from a first value to a second value is detected based at least on receipt of the event. It will be recognized that the second value is different from the first value. In an example implementation, the change detection logic 1176 detects that the value of the property changes from the first value to the second value based at least on receipt of the property change event 1186. The change detection logic 1176 generates property change information 1195 to indicate that the value of the property that is defined by the object has changed from the first value to the second value.

At step 906, a second object in the view model proxy that corresponds to the object in the view model is identified. In an example implementation, the object identification logic 1178 identifies the second object in the view model proxy. In an aspect of this implementation, the object identification logic 1178 analyzes proxy objects 1187, which are included in the view model proxy, to identify the second object. For instance, the object identification logic 1178 may compare the object in the view model to the proxy objects 1187 until the object identification logic 1178 identifies the second object in the proxy objects 1187 as a match to the object in the view model. The proxy objects 1187 may be .NET objects, though the scope of the example embodiments is not limited in this respect. The object identification logic 1178 generates corresponding object information 1191, which indicates that the second object in the view model proxy corresponds to the object in the view model.

At step 908, a value of a second property that is defined by the second object in the view model proxy is changed from the first value to the second value as a result of detecting that the value of the property, which is defined by the object in the view model, changes from the first value to the second value. In an example implementation, the property change logic 1180 changes the value of the second property that is defined by the second object in the view model proxy from the first value to the second value based on the property change information 1195 indicating that the value of the property that is defined by the object has changed from the first value to the second value and further based on the corresponding object information 1191 indicating that the second object in the view model proxy corresponds to the object in the view model. For instance, the property change logic 1180 may generate a changed object 1196, which is the second object in the view model proxy for which the value of the second property has been changed from the first value to the second value.

In another example embodiment, synchronizing the view model proxy with the view model at step 312 includes causing a change in the view model proxy to be automatically replicated in the view model. For example, if a user interacts with a user interface of the computer program, for example, by clicking a button that causes invocation of a command or by typing text into a text box, a corresponding object (e.g., a string variable defined by the object) in the view model proxy may be changed due to data binding between the button or the text box and the corresponding object, for example, to reflect that the command is invoked or that the text has been entered into the text box. In accordance with this example, the change of the object in the view model proxy may be automatically replicated in a corresponding object in the view model.

Figure 10:
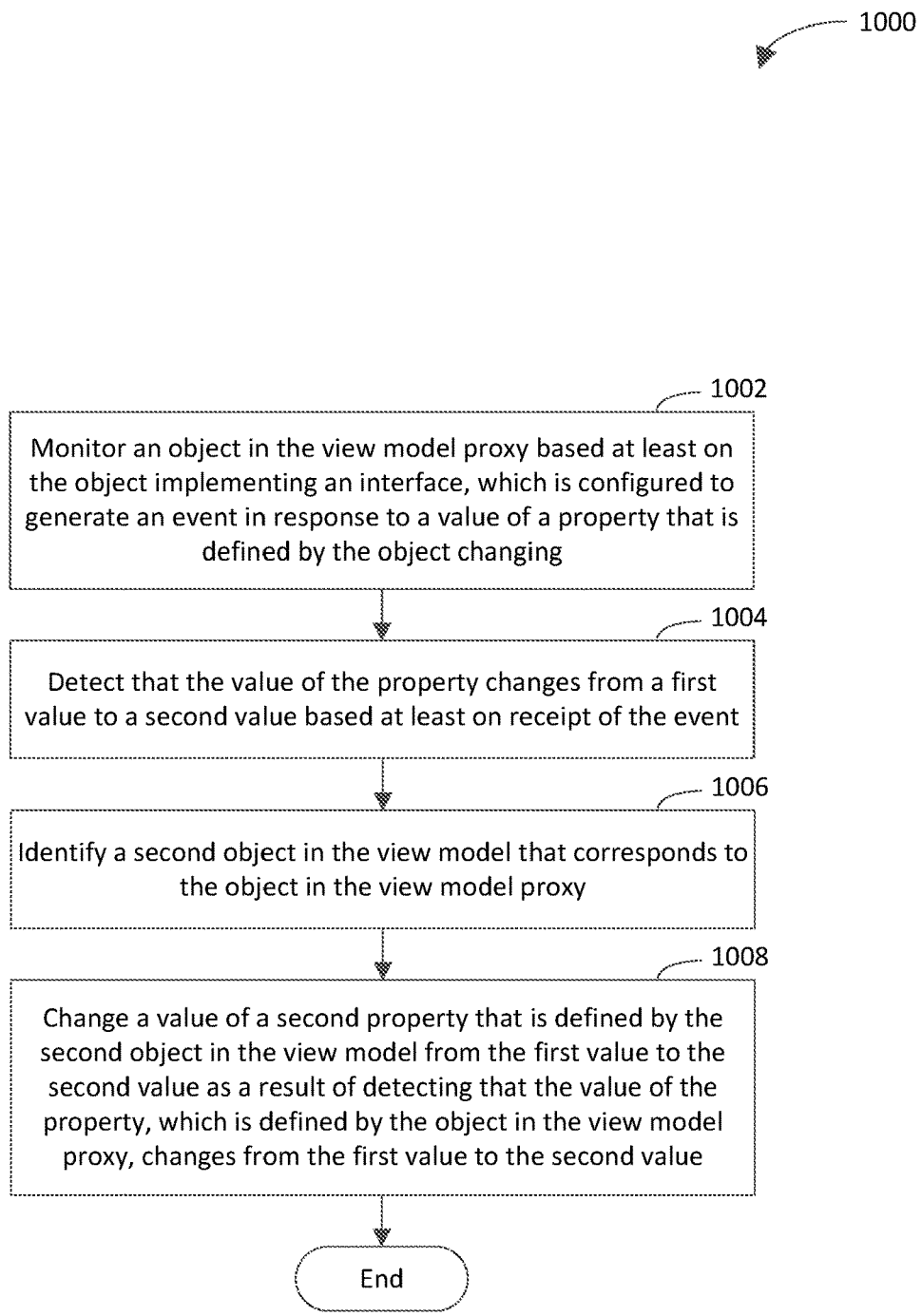
Figure 11:
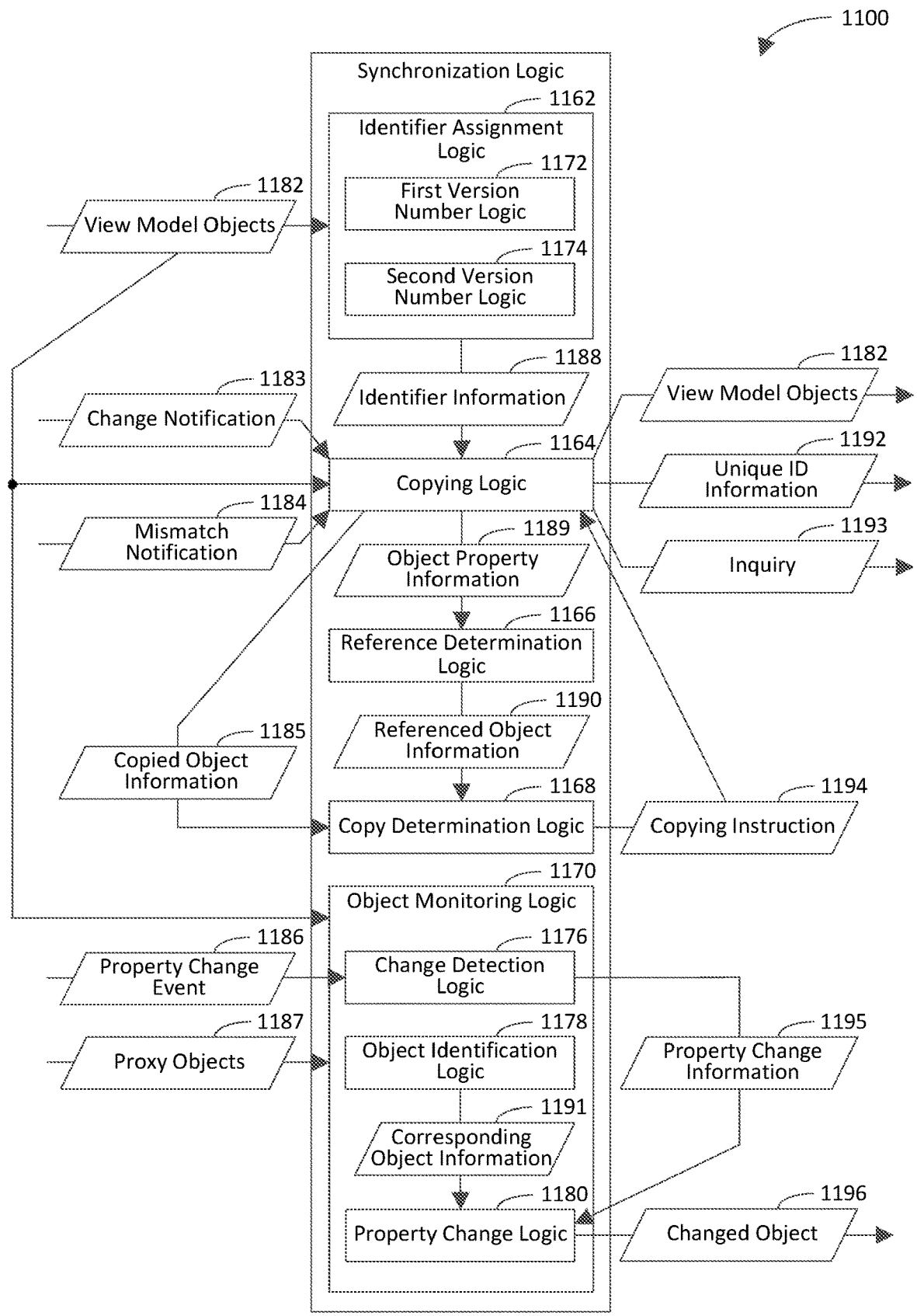
FIG. 11 is a block diagram of an example implementation of synchronization logic shown in FIG. 5 in accordance with an embodiment.

In an aspect of this embodiment, causing the change in the view model proxy to be automatically replicated in the view model includes one or more of the steps shown in flowchart 1000 of FIG. 10. As shown in FIG. 10, the method of flowchart 1000 begins at step 1002. In step 1002, an object in the view model proxy is monitored based at least on the object implementing an interface, which is configured to generate an event in response to a value of a property that is defined by the object changing. In an example, monitoring of the object at step 1002 is initiated by subscribing to the event that the interface implemented by the object is configured to generate. In another example, the object in the view model proxy is monitored at step 1002 using reflection. In an example implementation, the object monitoring logic 1170 monitors the object based at least on the object implementing the interface, which is configured to generate a property change event 1186 as a result of the value of the property that is defined by the object changing.

At step 1004, the value of the property changing from a first value to a second value is detected based at least on receipt of the event. It will be recognized that the second value is different from the first value. In an example implementation, the change detection logic 1176 detects that the value of the property changes from the first value to the second value based at least on receipt of the property change event 1186. The change detection logic 1176 generates property change information 1195 to indicate that the value of the property that is defined by the object has changed from the first value to the second value.

At step 1006, a second object in the view model that corresponds to the object in the view model proxy is identified. In an example implementation, the object identification logic 1178 identifies the second object in the view model. In an aspect of this implementation, the object identification logic 1178 analyzes the view model objects 1182, which are included in the view model, to identify the second object. For instance, the object identification logic 1178 may compare the object in the view model proxy to the view model objects 1182 until the object identification logic 1178 identifies the second object in the view model objects 1182 as a match to the object in the view model proxy. The object identification logic 1178 generates corresponding object information 1191, which indicates that the second object in the view model corresponds to the object in the view model proxy.

At step 1008, a value of a second property that is defined by the second object in the view model is changed from the first value to the second value as a result of detecting that the value of the property, which is defined by the object in the view model proxy, changes from the first value to the second value. In an example implementation, the property change logic 1180 changes the value of the second property that is defined by the second object in the view model from the first value to the second value based on the property change information 1195 indicating that the value of the property that is defined by the object has changed from the first value to the second value and further based on the corresponding object information 1191 indicating that the second object in the view model corresponds to the object in the view model proxy. For instance, the property change logic 1180 may generate a changed object 1196, which is the second object in the view model for which the value of the second property has been changed from the first value to the second value.

It will be recognized that any suitable type of information may be synchronized between the source process (e.g., the view model therein) and the target process (e.g., the view model proxy therein). For example, property changes may be identified and synchronized using the INotifyPropertyChanged interface. In another example, collection changes (e.g., item insertion, removal, and replacement) may be identified and synchronized using the ObservableCollection abstract class. In yet another example, validation state of a view model object may be identified and synchronized using the INotifyDataErrorInfo interface.

It will be recognized that the synchronization logic 1100 may not include one or more of the identifier assignment logic 1162, the copying logic 1164, the reference determination logic 1166, the copy determination logic 1168, the object monitoring logic 1170, the first version number logic 1172, the second version number logic 1174, the change detection logic 1176, the object identification logic 1178, and/or the property change logic 1180. Furthermore, the synchronization logic 1100 may include components in addition to or in lieu of the synchronization logic 1100 may not include one or more of the identifier assignment logic 1162, the copying logic 1164, the reference determination logic 1166, the copy determination logic 1168, the object monitoring logic 1170, the first version number logic 1172, the second version number logic 1174, the change detection logic 1176, the object identification logic 1178, and/or the property change logic 1180.

Figure 12:
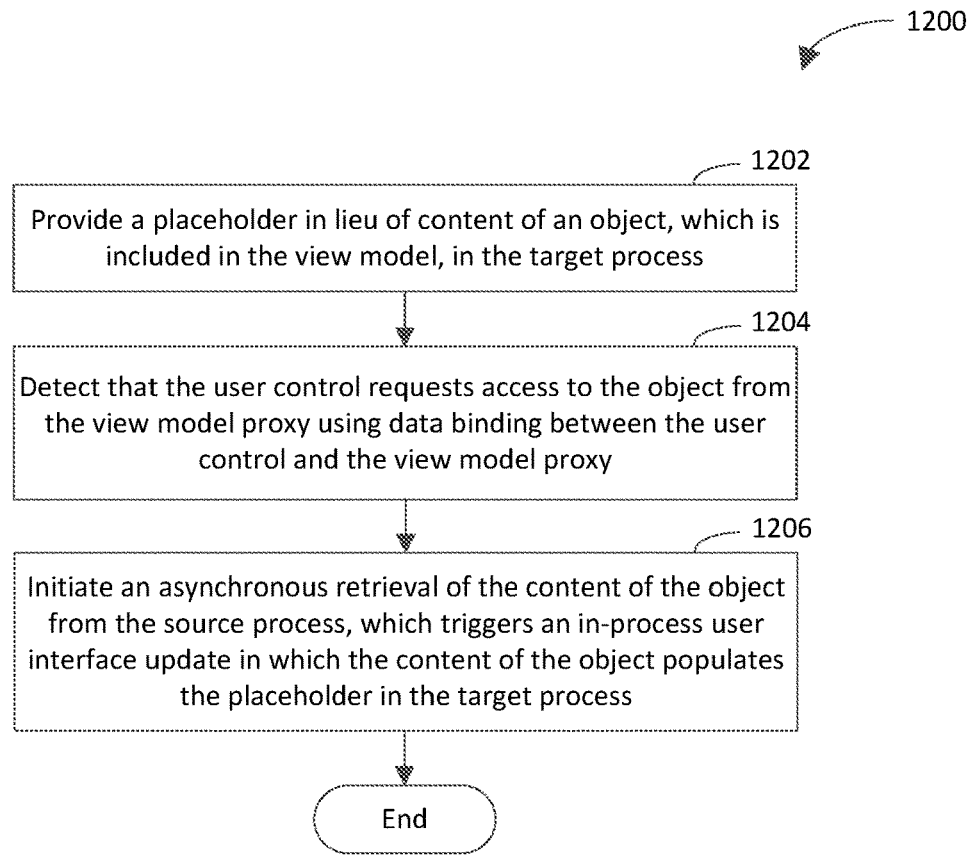
Figure 13:
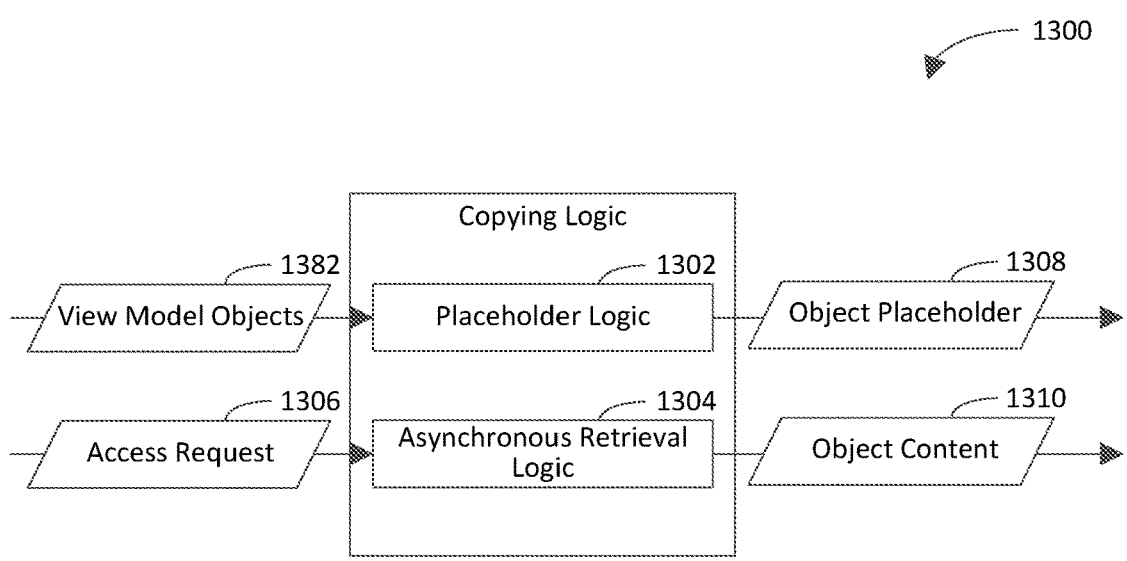
FIG. 13 is a block diagram of an example implementation of copying logic shown in FIG. 11 in accordance with an embodiment.

In yet another example embodiment, synchronizing the view model proxy with the view model at step 312 includes one or more of the steps shown in flowchart 1200 of FIG. 12. As shown in FIG. 12, the method of flowchart 1200 begins at step 1202. In step 1202, a placeholder is provided in lieu of content of an object, which is included in the view model, in the target process. In an example implementation, the placeholder logic 1302 provides an object placeholder 1308 in lieu of the content of the object in the target process. In an aspect, the placeholder logic 1302 analyzes view model objects 1382, which are included in the view model, to determine an identifier associated with the object. In accordance with this aspect, the placeholder logic 1302 uses the identifier as the object placeholder 1308.

At step 1204, the user control requesting access to the object from the view model proxy using data binding between the user control and the view model proxy is detected. In an example implementation, the asynchronous retrieval logic 1304 detects an access request 1306, which indicates that the user control requests the access to the object form the view model proxy.

At step 1206, an asynchronous retrieval of the content of the object from the source process is initiated (e.g., based at least on the user control requesting access to the object). Initiation of the asynchronous retrieval of the content triggers an in-process user interface update in which the content of the object populates the placeholder in the target process. In an example implementation, the asynchronous retrieval logic 1304 initiates asynchronous retrieval of object content 1310 of the object from the source process, which triggers the in-process user interface update in which the object content 1310 populates the object placeholder 1308 in the target process. In accordance with this implementation, the asynchronous retrieval logic 1304 may initiate the asynchronous retrieval of the object content 1310 from the source process based on receipt of the access request 1306 (e.g., based on the access request 1306 indicating that the user control requests the access to the object form the view model proxy).

It will be recognized that the copying logic 1300 may not include one or more of the placeholder logic 1302 and/or the asynchronous retrieval logic 1304. Furthermore, the copying logic 1300 may include components in addition to or in lieu of the placeholder logic 1302 and/or the asynchronous retrieval logic 1304.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the user interface extension logic 108, the user interface extension logic 308, the control generation logic 532, the proxy generation logic 534, the platform generation logic 536, the interaction detection logic 538, the state setting logic 540, the data binding logic 542, the synchronization logic 544, the identifier assignment logic 1162, the copying logic 1164, the reference determination logic 1166, the copy determination logic 1168, the object monitoring logic 1170, the first version number logic 1172, the second version number logic 1174, the change detection logic 1176, the object identification logic 1178, the property change logic 1180, the placeholder logic 1302, the asynchronous retrieval logic 1304, flowchart 300, flowchart 400, flowchart 600, flowchart 700, flowchart 800, flowchart 900, flowchart 1000, and/or flowchart 1200 may be implemented in hardware, software, firmware, or any combination thereof.

For example, any one or more of the user interface extension logic 108, the user interface extension logic 308, the control generation logic 532, the proxy generation logic 534, the platform generation logic 536, the interaction detection logic 538, the state setting logic 540, the data binding logic 542, the synchronization logic 544, the identifier assignment logic 1162, the copying logic 1164, the reference determination logic 1166, the copy determination logic 1168, the object monitoring logic 1170, the first version number logic 1172, the second version number logic 1174, the change detection logic 1176, the object identification logic 1178, the property change logic 1180, the placeholder logic 1302, the asynchronous retrieval logic 1304, flowchart 300, flowchart 400, flowchart 600, flowchart 700, flowchart 800, flowchart 900, flowchart 1000, and/or flowchart 1200 may be implemented, at least in part, as computer program code configured to be executed in one or more processors.

In another example, any one or more of the user interface extension logic 108, the user interface extension logic 308, the control generation logic 532, the proxy generation logic 534, the platform generation logic 536, the interaction detection logic 538, the state setting logic 540, the data binding logic 542, the synchronization logic 544, the identifier assignment logic 1162, the copying logic 1164, the reference determination logic 1166, the copy determination logic 1168, the object monitoring logic 1170, the first version number logic 1172, the second version number logic 1174, the change detection logic 1176, the object identification logic 1178, the property change logic 1180, the placeholder logic 1302, the asynchronous retrieval logic 1304, flowchart 300, flowchart 400, flowchart 600, flowchart 700, flowchart 800, flowchart 900, flowchart 1000, and/or flowchart 1200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
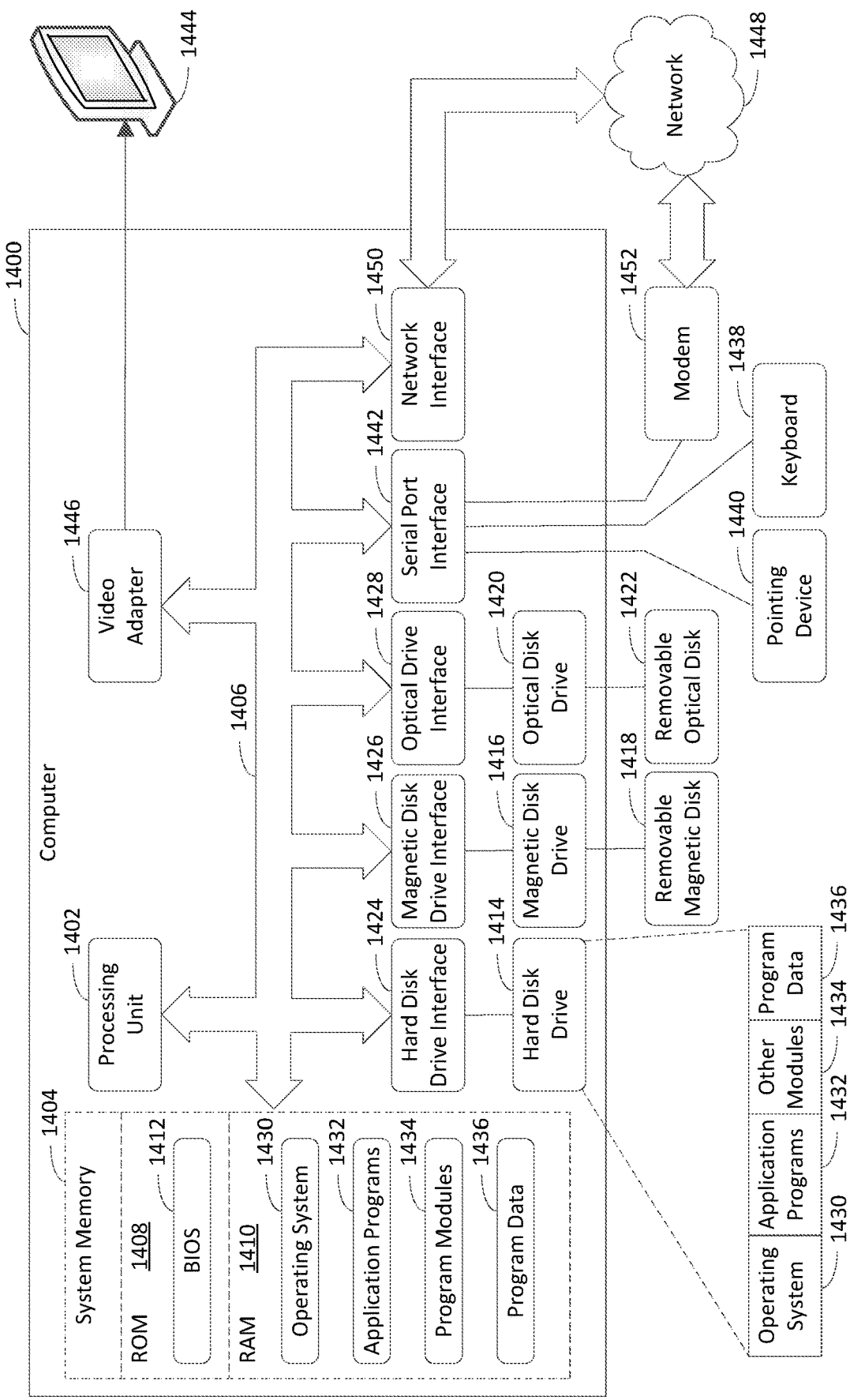
FIG. 14 depicts an example computer in which embodiments may be implemented.

II. Further Discussion of Some Example Embodiments (A1) An example system (FIG. 1, 102A-102M, 106A-106N; FIG. 5, 500; FIG. 14, 1400) comprises memory (FIG. 14, 1404, 1408, 1410) and a processing system (FIG. 14, 1402) coupled to the memory. The processing system is configured to generate (FIG. 3, 304) a user control (FIG. 2, 224; FIG. 5, 524) in a target process (FIG. 2, 228) in which a computer program (FIG. 2, 220) runs, based at least on a declarative definition (FIG. 2, 214; FIG. 5, 514), which defines a structure and a behavior of a user interface and which is received at the target process from a source process (FIG. 2, 218) in which an executable file (FIG. 2, 210) runs. The target process is external to the source process. The processing system is further configured to generate (FIG. 3, 308) a view model proxy (FIG. 2, 226; FIG. 5, 526), which is a proxy of a view model (FIG. 2, 216; FIG. 5, 516) that is data bound to the declarative definition and that represents a state of the user interface, in the target process, based at least on a view model identifier that identifies the view model and that is received at the target process from the source process. The processing system is further configured to data bind (FIG. 3, 310) the user control in the target process with the view model proxy in the target process. The processing system is further configured to extend (FIG. 3, 312) user interface functionality of the computer program, which runs in the target process, to the executable file, which runs in the source process, by synchronizing the view model proxy in the target process with the view model in the source process.

(A2) In the example system of A1, wherein the executable file is an extension of the computer program that adds functionality to the computer program.

(A3) In the example system of any of A1-A2, wherein the processing system is configured to: data bind the user control in the target process with a first instance of an object in the view model proxy in the target process; and wait to copy content from a second instance of the object in the view model in the source process into the first instance of the object in the view model proxy in the target process until the user control in the target process is data bound to the first instance of the object in the view model proxy in the target process.

(A4) In the example system of any of A1-A3, wherein the processing system is configured to: based at least on the user control being data bound with the first instance of the object in the view model proxy, provide a content request, which includes an identifier that identifies the object, from the target process to the source process, the content request requesting content of the object; and receive a serialized version of the content of the object at the target process from the source process based at least on the content request.

(A5) In the example system of any of A1-A4, wherein the processing system is configured to: data bind an interface element, which is included in the user control, with a state of an asynchronous command that is defined by an object in the view model proxy.

(A6) In the example system of any of A1-A5, wherein the processing system is further configured to: detect user interaction with regard to the interface element; based at least on detection of the user interaction with regard to the interface element, set a Boolean operator that is associated with the asynchronous command to a first state, the first state indicating that the asynchronous command is executing; based at least on the detection of the user interaction with regard to the interface element, provide a first notification from the target process to the source process, the first notification indicating that the asynchronous command is invoked; based at least on the first notification being provided from the target process to the source process, trigger execution of the asynchronous command asynchronously in the source process; receive a second notification at the target process from the source process, the second notification indicating that the execution of the asynchronous command in the source process is complete; and based at least on the second notification being received at the target process from the source process, change the Boolean operator that is associated with the asynchronous command from the first state to a second state, the second state indicating that the asynchronous command is not executing.

(A7) In the example system of any of A1-A6, wherein the processing system is configured to: disable functionality of the interface element by setting the Boolean operator to the first state; and enable the functionality of the interface element by changing the Boolean operator from the first state to the second state.

(A8) In the example system of any of A1-A7, wherein the processing system is configured to: copy objects, which are included in the view model, into the view model proxy; assign first version numbers to the respective objects, each first version number indicating a number of changes to the respective object in the view model that are initiated by the source process; assign second version numbers to the respective objects, each second version number indicating a number of changes to the respective object in the view model proxy that are initiated by the target process; receive a change notification from the source process, the change notification indicating that a change is to be made to a particular object in the view model proxy; and based at least on the first version number of the particular object and the second version number of the particular object not being same, not make the change to the particular object in the view model.

(A9) In the example system of any of A1-A8, wherein the processing system is further configured to: based at least on the first version number of the particular object and the second version number of the particular object not being the same, receive a mismatch notification at the target process from the source process, the mismatch notification indicating that the first version number of the particular object and the second version number of the particular object are not the same, the mismatch notification including a current value of the particular object in the view model and the first version number that is assigned to the particular object.

(A10) In the example system of any of A1-A9, wherein the processing system is configured to: copy objects, which are included in the view model, into the view model proxy; assign first version numbers to the respective objects, each first version number indicating a number of changes to the respective object in the view model that are initiated by the source process; assign second version numbers to the respective objects, each second version number indicating a number of changes to the respective object in the view model proxy that are initiated by the target process; receive a change notification from the target process, the change notification indicating that a change is to be made to a particular object in the view model; and based at least on the first version number of the particular object and the second version number of the particular object not being same, not make the change to the particular object in the view model proxy.

(A11) In the example system of any of A1-A10, wherein the processing system is further configured to: based at least on the first version number of the particular object and the second version number of the particular object not being the same, provide an inquiry from the target process to the source process, the inquiry requesting a current value of the particular object in the view model and the first version number that is assigned to the particular object.

(A12) In the example system of any of A1-A11, wherein the processing system is configured to: assign unique identifiers to respective objects in the view model; and copy the objects and the unique identifiers that are assigned to the respective objects from the view model into the view model proxy.

(A13) In the example system of any of A1-A12, wherein correlation between the unique identifiers and the respective objects in the view model is preserved using weak references, such that the correlation does not interfere with garbage collection of the objects.

(A14) In the example system of any of A1-A13, wherein the processing system is configured to: determine that a first object that is copied from the view model into the view model proxy defines a property that references a second object; determine that the second object was previously copied from the view model into the view model proxy; based at least on the second object being previously copied from the view model into the view model proxy, provide the unique identifier of the second object, and not content of the second object, from the view model to the view model proxy; and reconstruct the content of the second object in the view model proxy from a local copy of the second object, which was previously copied from the view model into the view model proxy, by using the unique identifier of the second object to identify the local copy.

(A15) In the example system of any of A1-A14, wherein the processing system is configured to synchronize the view model proxy with the view model by causing a change in the view model to be automatically replicated in the view model proxy.

(A16) In the example system of any of A1-A15, wherein the processing system is configured to cause the change in the view model to be automatically replicated in the view model proxy by performing the following operations: monitor an object in the view model based at least on the object implementing an interface, which is configured to generate an event in response to a value of a property that is defined by the object changing; detect that the value of the property changes from a first value to a second value based at least on receipt of the event; identify a second object in the view model proxy that corresponds to the object in the view model; and change a value of a second property that is defined by the second object in the view model proxy from the first value to the second value as a result of detecting that the value of the property, which is defined by the object in the view model, changes from the first value to the second value.

(A17) In the example system of any of A1-A16, wherein the processing system is configured to synchronize the view model proxy with the view model by performing the following operations: detect that the user control requests access to an object, which is included in the view model, from the view model proxy using data binding between the user control and the view model proxy; provide a placeholder in lieu of content of the object in the target process; and based at least on the user control requesting access to the object, initiate an asynchronous retrieval of the content of the object from the source process, which triggers an in-process user interface update in which the content of the object populates the placeholder in the target process.

(A18) In the example system of any of A1-A17, wherein the processing system is configured to synchronize the view model proxy with the view model by causing a change in the view model proxy to be automatically replicated in the view model.

(A19) In the example system of any of A1-A18, wherein the processing system is configured to cause the change in the view model proxy to be automatically replicated in the view model by performing the following operations: monitor an object in the view model proxy based at least on the object implementing an interface, which is configured to generate an event in response to a value of a property that is defined by the object changing; detect that the value of the property changes from a first value to a second value based at least on receipt of the event; identify a second object in the view model that corresponds to the object in the view model proxy; and change a value of a second property that is defined by the second object in the view model from the first value to the second value as a result of detecting that the value of the property, which is defined by the object in the view model proxy, changes from the first value to the second value.

(A20) In the example system of any of A1-A19, wherein the target process executes on the computing system, and the source process executes on another computing system.

(B1) An example method is implemented by a computing system (FIG. 1, 102A-102M, 106A-106N; FIG. 5, 500; FIG. 14, 1400). The method comprises receiving (FIG. 3, 302) a declarative definition (FIG. 2, 214; FIG. 5, 514), which defines a structure and a behavior of a user interface, at a target process (FIG. 2, 228) in which a computer program (FIG. 2, 220) runs from a source process (FIG. 2, 218) in which an executable file (FIG. 2, 210) runs. The target process is external to the source process. The method further comprises generating (FIG. 3, 304) a user control (FIG. 2, 224; FIG. 5, 524) in the target process based at least on the declarative definition that is received from the source process. The method further comprises receiving (FIG. 3, 306) a view model identifier that identifies a view model (FIG. 2, 216; FIG. 5, 516), which is data bound to the declarative definition and which represents a state of the user interface, at the target process from the source process. The method further comprises generating (FIG. 3, 308) a view model proxy (FIG. 2, 226; FIG. 5, 526), which is a proxy of the view model, in the target process based at least on the view model identifier. The method further comprises data binding (FIG. 3, 310) the user control in the target process with the view model proxy in the target process. The method further comprises extending (FIG. 3, 312) user interface functionality of the computer program, which runs in the target process, to the executable file, which runs in the source process, by synchronizing the view model proxy in the target process with the view model in the source process.

(B2) In the method of B1, wherein the executable file is an extension of the computer program that adds functionality to the computer program.

(B3) In the method of any of B1-B2, wherein data binding the user control with the view model proxy comprises: data binding the user control in the target process with a first instance of an object in the view model proxy in the target process; and wherein synchronizing the view model proxy with the view model comprises: waiting to copy content from a second instance of the object in the view model in the source process into the first instance of the object in the view model proxy in the target process until the user control in the target process is data bound to the first instance of the object in the view model proxy in the target process.

(B4) In the method of any of B1-B3, wherein synchronizing the view model proxy with the view model comprises: based at least on the user control being data bound with the first instance of the object in the view model proxy, providing a content request, which includes an identifier that identifies the object, from the target process to the source process, the content request requesting content of the object; and receiving a serialized version of the content of the object at the target process from the source process based at least on the content request.

(B5) In the method of any of B1-B4, wherein data binding the user control with the view model proxy comprises: data binding an interface element, which is included in the user control, with a state of an asynchronous command that is defined by an object in the view model proxy.

(B6) In the method of any of B1-B5, further comprising: detecting user interaction with regard to the interface element; based at least on detection of the user interaction with regard to the interface element, setting a Boolean operator that is associated with the asynchronous command to a first state, the first state indicating that the asynchronous command is executing; based at least on the detection of the user interaction with regard to the interface element, providing a first notification from the target process to the source process, the first notification indicating that the asynchronous command is invoked; based at least on the first notification being provided from the target process to the source process, triggering execution of the asynchronous command asynchronously in the source process; receiving a second notification at the target process from the source process, the second notification indicating that the execution of the asynchronous command in the source process is complete; and based at least on the second notification being received at the target process from the source process, changing the Boolean operator that is associated with the asynchronous command from the first state to a second state, the second state indicating that the asynchronous command is not executing.

(B7) In the method of any of B1-B6, wherein setting the Boolean operator to the first state disables functionality of the interface element; and wherein changing the Boolean operator from the first state to the second state enables the functionality of the interface element.

(B8) In the method of any of B1-B7, wherein synchronizing the view model proxy with the view model comprises: copying objects, which are included in the view model, into the view model proxy; assigning first version numbers to the respective objects, each first version number indicating a number of changes to the respective object in the view model that are initiated by the source process; assigning second version numbers to the respective objects, each second version number indicating a number of changes to the respective object in the view model proxy that are initiated by the target process; receiving a change notification from the source process, the change notification indicating that a change is to be made to a particular object in the view model proxy; and based at least on the first version number of the particular object and the second version number of the particular object not being same, not making the change to the particular object in the view model.

(B9) In the method of any of B1-B8, further comprising: based at least on the first version number of the particular object and the second version number of the particular object not being the same, receiving a mismatch notification at the target process from the source process, the mismatch notification indicating that the first version number of the particular object and the second version number of the particular object are not the same, the mismatch notification including a current value of the particular object in the view model and the first version number that is assigned to the particular object.

(B10) In the method of any of B1-B9, wherein synchronizing the view model proxy with the view model comprises: copying objects, which are included in the view model, into the view model proxy; assigning first version numbers to the respective objects, each first version number indicating a number of changes to the respective object in the view model that are initiated by the source process; assigning second version numbers to the respective objects, each second version number indicating a number of changes to the respective object in the view model proxy that are initiated by the target process; receiving a change notification from the target process, the change notification indicating that a change is to be made to a particular object in the view model; and based at least on the first version number of the particular object and the second version number of the particular object not being same, not making the change to the particular object in the view model proxy.

(B11) In the method of any of B1-B10, further comprising: based at least on the first version number of the particular object and the second version number of the particular object not being the same, providing an inquiry from the target process to the source process, the inquiry requesting a current value of the particular object in the view model and the first version number that is assigned to the particular object.

(B12) In the method of any of B1-B11, wherein synchronizing the view model proxy with the view model comprises: assigning unique identifiers to respective objects in the view model; and copying the objects and the unique identifiers that are assigned to the respective objects from the view model into the view model proxy.

(B13) In the method of any of B1-B12, wherein correlation between the unique identifiers and the respective objects in the view model is preserved using weak references, such that the correlation does not interfere with garbage collection of the objects.

(B14) In the method of any of B1-B13, determining that a first object that is copied from the view model into the view model proxy defines a property that references a second object; determining that the second object was previously copied from the view model into the view model proxy; based at least on the second object being previously copied from the view model into the view model proxy, providing the unique identifier of the second object, and not content of the second object, from the view model to the view model proxy; and reconstruct the content of the second object in the view model proxy from a local copy of the second object, which was previously copied from the view model into the view model proxy, by using the unique identifier of the second object to identify the local copy.

(B15) In the method of any of B1-B14, wherein synchronizing the view model proxy with the view model comprises: causing a change in the view model to be automatically replicated in the view model proxy.

(B16) In the method of any of B1-B15, wherein causing the change in the view model to be automatically replicated in the view model proxy comprises: monitoring an object in the view model based at least on the object implementing an interface, which is configured to generate an event in response to a value of a property that is defined by the object changing; detecting that the value of the property changes from a first value to a second value based at least on receipt of the event; identifying a second object in the view model proxy that corresponds to the object in the view model; and changing a value of a second property that is defined by the second object in the view model proxy from the first value to the second value as a result of detecting that the value of the property, which is defined by the object in the view model, changes from the first value to the second value.

(B17) In the method of any of B1-B16, wherein synchronizing the view model proxy with the view model comprises: detecting that the user control requests access to an object, which is included in the view model, from the view model proxy using data binding between the user control and the view model proxy; providing a placeholder in lieu of content of the object in the target process; and based at least on the user control requesting access to the object, initiating an asynchronous retrieval of the content of the object from the source process, which triggers an in-process user interface update in which the content of the object populates the placeholder in the target process.

(B18) In the method of any of B1-B17, wherein synchronizing the view model proxy with the view model comprises: causing a change in the view model proxy to be automatically replicated in the view model.

(B19) In the method of any of B1-B18, wherein causing the change in the view model proxy to be automatically replicated in the view model comprises: monitoring an object in the view model proxy based at least on the object implementing an interface, which is configured to generate an event in response to a value of a property that is defined by the object changing; detecting that the value of the property changes from a first value to a second value based at least on receipt of the event; identifying a second object in the view model that corresponds to the object in the view model proxy; and changing a value of a second property that is defined by the second object in the view model from the first value to the second value as a result of detecting that the value of the property, which is defined by the object in the view model proxy, changes from the first value to the second value.

(B20) In the method of any of B1-B19, wherein the target process executes on the computing system, and the source process executes on another computing system.

(C1) An example computer program product (FIG. 14, 1418, 1422) comprising a computer-readable storage medium having instructions recorded thereon for enabling a processor-based system (FIG. 1, 102A-102M, 106A-106N; FIG. 5, 500; FIG. 14, 1400) to perform operations. The operations comprise generating (FIG. 3, 304) a user control (FIG. 2, 224; FIG. 5, 524) in a target process (FIG. 2, 228) in which a computer program (FIG. 2, 220) runs, based at least on a declarative definition (FIG. 2, 214; FIG. 5, 514), which defines a structure and a behavior of a user interface and which is received at the target process from a source process (FIG. 2, 218) in which an executable file (FIG. 2, 210) runs. The target process is external to the source process. The operations further comprise generating (FIG. 3, 308) a view model proxy (FIG. 2, 226; FIG. 5, 526), which is a proxy of a view model (FIG. 2, 216; FIG. 5, 516) that is data bound to the declarative definition and that represents a state of the user interface, in the target process, based at least on a view model identifier that identifies the view model and that is received at the target process from the source process. The operations further comprise data binding (FIG. 3, 310) the user control in the target process with the view model proxy in the target process. The operations further comprise extending (FIG. 3, 312) user interface functionality of the computer program, which runs in the target process, to the executable file, which runs in the source process, by synchronizing the view model proxy in the target process with the view model in the source process.

III. Example Computer System

FIG. 14 depicts an example computer 1400 in which embodiments may be implemented. Any one or more of the user devices 102A-102M and/or any one or more of the servers 106A-106N shown in FIG. 1 and/or computing system 500 shown in FIG. 5 may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing any one or more of (e.g., at least a portion of) the user interface extension logic 108, the user interface extension logic 308, the control generation logic 532, the proxy generation logic 534, the platform generation logic 536, the interaction detection logic 538, the state setting logic 540, the data binding logic 542, the synchronization logic 544, the identifier assignment logic 1162, the copying logic 1164, the reference determination logic 1166, the copy determination logic 1168, the object monitoring logic 1170, the first version number logic 1172, the second version number logic 1174, the change detection logic 1176, the object identification logic 1178, the property change logic 1180, the placeholder logic 1302, the asynchronous retrieval logic 1304, flowchart 300 (including any step of flowchart 300), flowchart 400 (including any step of flowchart 400), flowchart 600 (including any step of flowchart 600), flowchart 700 (including any step of flowchart 700), flowchart 800 (including any step of flowchart 800), flowchart 900 (including any step of flowchart 900), flowchart 1000 (including any step of flowchart 1000), and/or flowchart 1200 (including any step of flowchart 1200), as described herein.

A user may enter commands and information into the computer 1400 through input devices such as keyboard 1438 and pointing device 1440. Other input devices (not shown) may include a microphone, joystick, game pad, satellite dish, scanner, touch screen, camera, accelerometer, gyroscope, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446. In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable storage medium" are used to generally refer to media (e.g., non-transitory media) such as the hard disk associated with hard disk drive 1414, removable magnetic disk 1418, removable optical disk 1422, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
   generate a user control in a target process in which a computer program runs, based at least on a declarative definition, which defines a structure and a behavior of a user interface and which is received at the target process from a source process in which an executable file runs, the target process is external to the source process;

generate a view model proxy, which is a proxy of a view model that is data bound to the declarative definition and that represents a state of the user interface, in the target process, based at least on a view model identifier that identifies the view model and that is received at the target process from the source process;

data bind the user control in the target process with the view model proxy in the target process; and extend user interface functionality of the computer program, which runs in the target process, to the executable file, which runs in the source process, by synchronizing the view model proxy in the target process with the view model in the source process.

2. The system of claim 1, wherein the processing system is configured to:

data bind the user control in the target process with a first instance of an object in the view model proxy in the target process; and wait to copy content from a second instance of the object in the view model in the source process into the first instance of the object in the view model proxy in the target process until the user control in the target process is data bound to the first instance of the object in the view model proxy in the target process.

3. The system of claim 2, wherein the processing system is configured to:

based at least on the user control being data bound with the first instance of the object in the view model proxy, provide a content request, which includes an identifier that identifies the object, from the target process to the source process, the content request requesting content of the object; and receive a serialized version of the content of the object at the target process from the source process based at least on the content request.

4. The system of claim 1, wherein the processing system is configured to:

copy objects, which are included in the view model, into the view model proxy;

assign first version numbers to the respective objects, each first version number indicating a number of changes to the respective object in the view model that are initiated by the source process;

assign second version numbers to the respective objects, each second version number indicating a number of changes to the respective object in the view model proxy that are initiated by the target process;

receive a change notification from the target process, the change notification indicating that a change is to be made to a particular object in the view model; and based at least on the first version number of the particular object and the second version number of the particular object not being same, not make the change to the particular object in the view model proxy.

5. The system of claim 4, wherein the processing system is further configured to:

based at least on the first version number of the particular object and the second version number of the particular object not being the same, provide an inquiry from the target process to the source process, the inquiry requesting a current value of the particular object in the view model and the first version number that is assigned to the particular object.

6. The system of claim 1, wherein the processing system is configured to:

assign unique identifiers to respective objects in the view model; and copy the objects and the unique identifiers that are assigned to the respective objects from the view model into the view model proxy.

7. The system of claim 6, wherein correlation between the unique identifiers and the respective objects in the view model is preserved using weak references, such that the correlation does not interfere with garbage collection of the objects.

8. The system of claim 6, wherein the processing system is configured to:

determine that a first object that is copied from the view model into the view model proxy defines a property that references a second object;

determine that the second object was previously copied from the view model into the view model proxy;

based at least on the second object being previously copied from the view model into the view model proxy, provide the unique identifier of the second object, and not content of the second object, from the view model to the view model proxy; and reconstruct the content of the second object in the view model proxy from a local copy of the second object, which was previously copied from the view model into the view model proxy, by using the unique identifier of the second object to identify the local copy.

9. The system of claim 1, wherein the processing system is configured to synchronize the view model proxy with the view model by causing a change in the view model to be automatically replicated in the view model proxy.

10. The system of claim 9, wherein the processing system is configured to cause the change in the view model to be automatically replicated in the view model proxy by performing the following operations:

monitor an object in the view model based at least on the object implementing an interface, which is configured to generate an event in response to a value of a property that is defined by the object changing;

detect that the value of the property changes from a first value to a second value based at least on receipt of the event;

identify a second object in the view model proxy that corresponds to the object in the view model; and change a value of a second property that is defined by the second object in the view model proxy from the first value to the second value as a result of detecting that the value of the property, which is defined by the object in the view model, changes from the first value to the second value.

11. The system of claim 1, wherein the processing system is configured to synchronize the view model proxy with the view model by performing the following operations:

detect that the user control requests access to an object, which is included in the view model, from the view model proxy using data binding between the user control and the view model proxy;

provide a placeholder in lieu of content of the object in the target process; and based at least on the user control requesting access to the object, initiate an asynchronous retrieval of the content of the object from the source process, which triggers an in-process user interface update in which the content of the object populates the placeholder in the target process.

12. The system of claim 1, wherein the processing system is configured to synchronize the view model proxy with the view model by causing a change in the view model proxy to be automatically replicated in the view model.

13. The system of claim 12, wherein the processing system is configured to cause the change in the view model proxy to be automatically replicated in the view model by performing the following operations:
monitor an object in the view model proxy based at least on the object implementing an interface, which is configured to generate an event in response to a value of a property that is defined by the object changing;
detect that the value of the property changes from a first value to a second value based at least on receipt of the event;
identify a second object in the view model that corresponds to the object in the view model proxy; and
change a value of a second property that is defined by the second object in the view model from the first value to the second value as a result of detecting that the value of the property, which is defined by the object in the view model proxy, changes from the first value to the second value.

14. A method implemented by a computing system, the method comprising:
receiving a declarative definition, which defines a structure and a behavior of a user interface, at a target process in which a computer program runs from a source process in which an executable file runs, the target process is external to the source process;
generating a user control in the target process based at least on the declarative definition that is received from the source process;
receiving a view model identifier that identifies a view model, which is data bound to the declarative definition and which represents a state of the user interface, at the target process from the source process;
generating a view model proxy, which is a proxy of the view model, in the target process based at least on the view model identifier;
data binding the user control in the target process with the view model proxy in the target process; and
extending user interface functionality of the computer program, which runs in the target process, to the executable file, which runs in the source process, by synchronizing the view model proxy in the target process with the view model in the source process.

15. The method of claim 14, wherein the executable file is an extension of the computer program that adds functionality to the computer program.

16. The method of claim 14, wherein data binding the user control with the view model proxy comprises:
data binding an interface element, which is included in the user control, with a state of an asynchronous command that is defined by an object in the view model proxy.

17. The method of claim 16, further comprising:
detecting user interaction with regard to the interface element;
based at least on detection of the user interaction with regard to the interface element, setting a Boolean operator that is associated with the asynchronous command to a first state, the first state indicating that the asynchronous command is executing;
based at least on the detection of the user interaction with regard to the interface element, providing a first notification from the target process to the source process, the first notification indicating that the asynchronous command is invoked;
based at least on the first notification being provided from the target process to the source process, triggering execution of the asynchronous command asynchronously in the source process;
receiving a second notification at the target process from the source process, the second notification indicating that the execution of the asynchronous command in the source process is complete; and
based at least on the second notification being received at the target process from the source process, changing the Boolean operator that is associated with the asynchronous command from the first state to a second state, the second state indicating that the asynchronous command is not executing.

18. The method of claim 17, wherein setting the Boolean operator to the first state disables functionality of the interface element; and
wherein changing the Boolean operator from the first state to the second state enables the functionality of the interface element.

19. The method of claim 14, wherein synchronizing the view model proxy with the view model comprises:
copying objects, which are included in the view model, into the view model proxy;
assign first version numbers to the respective objects, each first version number indicating a number of changes to the respective object in the view model that are initiated by the source process;
assign second version numbers to the respective objects, each second version number indicating a number of changes to the respective object in the view model proxy that are initiated by the target process;
receiving a change notification from the source process, the change notification indicating that a change is to be made to a particular object in the view model proxy; and
based at least on the first version number of the particular object and the second version number of the particular object not being same, not making the change to the particular object in the view model.

20. The method of claim 19, further comprising:
based at least on the first version number of the particular object and the second version number of the particular object not being the same, receiving a mismatch notification at the target process from the source process, the mismatch notification indicating that the first version number of the particular object and the second version number of the particular object are not the same, the mismatch notification including a current value of the particular object in the view model and the first version number that is assigned to the particular object.

21. The method of claim 14, wherein the target process executes on the computing system, and the source process executes on another computing system.

22. A computer program product comprising a computer-readable storage medium having instructions recorded thereon for enabling a processor-based system to perform operations, the operations comprising:
generating a user control in a target process in which a computer program runs, based at least on a declarative definition, which defines a structure and a behavior of a user interface and which is received at the target process from a source process in which an executable file runs, the target process is external to the source process;

generating a view model proxy, which is a proxy of a view model that is data bound to the declarative definition and that represents a state of the user interface, in the target process, based at least on a view model identifier that identifies the view model and that is received at the target process from the source process;

data binding the user control in the target process with the view model proxy in the target process; and extending user interface functionality of the computer program, which runs in the target process, to the executable file, which runs in the source process, by synchronizing the view model proxy in the target process with the view model in the source process.

\* \* \* \* \*